(12) United States Patent
Kuffel et al.

(10) Patent No.: US 12,554,087 B2
(45) Date of Patent: Feb. 17, 2026

(54) HIGH-DENSITY FIBER MANAGEMENT SYSTEM

(71) Applicant: Panduit Corp., Tinley Park, IL (US)

(72) Inventors: Gregory L. Kuffel, Plainfield, IL (US); Jeremy S. Parrish, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 332 days.

(21) Appl. No.: 18/123,631

(22) Filed: Mar. 20, 2023

(65) Prior Publication Data

US 2023/0305252 A1 Sep. 28, 2023

Related U.S. Application Data

(60) Provisional application No. 63/322,830, filed on Mar. 23, 2022.

(51) Int. Cl.
*G02B 6/00* (2006.01)
*G02B 6/44* (2006.01)

(52) U.S. Cl.
CPC .......... *G02B 6/4452* (2013.01); *G02B 6/4453* (2013.01)

(58) Field of Classification Search
CPC ................ G02B 6/4452; G02B 6/4453; G02B 6/44526; G02B 6/44524; G02B 6/00
See application file for complete search history.

(56) References Cited

U.S. PATENT DOCUMENTS

| | | | |
|---|---|---|---|
| 5,898,129 A | 4/1999 | Ott et al. | |
| 6,259,850 B1 | 7/2001 | Crosby, Jr. et al. | |
| 6,768,860 B2 | 7/2004 | Liberty | |
| 7,509,015 B2 | 3/2009 | Murano | |
| 7,570,860 B2 | 8/2009 | Smrha et al. | |
| 7,570,861 B2 | 8/2009 | Smrha et al. | |
| 7,751,674 B2 | 7/2010 | Hill | |
| 7,873,252 B2 | 1/2011 | Smrha et al. | |
| 7,873,253 B2 | 1/2011 | Smrha et al. | |
| 8,340,490 B2 | 12/2012 | Smrha et al. | |
| 8,346,044 B2 | 1/2013 | Smrha et al. | |
| 8,452,148 B2 | 5/2013 | Cooke et al. | |
| 8,712,206 B2 | 4/2014 | Cooke | |
| 8,867,884 B2 | 10/2014 | Smrha et al. | |
| 8,953,921 B2 | 2/2015 | Smrha et al. | |
| 8,958,680 B2 | 2/2015 | Bragg | |
| 9,020,320 B2 | 4/2015 | Cooke et al. | |
| 9,075,216 B2 | 7/2015 | Cote et al. | |
| 9,097,871 B2 | 8/2015 | Smrha et al. | |
| 9,285,558 B2 | 3/2016 | Gross et al. | |
| 9,435,974 B2 | 9/2016 | Smrha et al. | |
| 9,435,976 B2 | 9/2016 | Smrha et al. | |
| 9,448,378 B2 | 9/2016 | Smrha et al. | |
| 9,448,379 B2 | 9/2016 | Smrha et al. | |
| 9,488,796 B2 | 11/2016 | Smrha et al. | |
| 9,575,275 B2 | 2/2017 | Blackwell, Jr. et al. | |
| 9,638,879 B2 | 5/2017 | Smrha et al. | |
| 9,638,880 B2 | 5/2017 | Smrha et al. | |
| 9,645,342 B2 | 5/2017 | Smrha et al. | |

(Continued)

*Primary Examiner* — Jennifer Doan

(74) *Attorney, Agent, or Firm* — Peter S. Lee; Christopher S. Clancy; James H. Williams

(57) ABSTRACT

A high-density fiber management system enables a high density of fiber cables to be managed and routed within a known dimensional area. The high-density fiber management system includes a patch panel and modules for installation into the patch panel.

11 Claims, 33 Drawing Sheets

(56) References Cited

U.S. PATENT DOCUMENTS

| | | | |
|---|---|---|---|
| 9,690,066 B2 | 6/2017 | Smrha et al. | |
| 9,703,059 B2 | 7/2017 | Smrha et al. | |
| 9,709,764 B2 | 7/2017 | Smrha et al. | |
| 9,910,236 B2 | 3/2018 | Cooke et al. | |
| 9,995,897 B2 | 6/2018 | Smrha et al. | |
| 10,094,996 B2 | 10/2018 | Cooke et al. | |
| 10,120,153 B2 | 11/2018 | Cooke et al. | |
| 10,126,514 B2 | 11/2018 | Cooke et al. | |
| 10,203,464 B1 | 2/2019 | Smrha et al. | |
| 10,222,570 B2 | 3/2019 | Cooke et al. | |
| 10,310,204 B2 | 6/2019 | Smrha et al. | |
| 10,416,405 B2 | 9/2019 | Cooke et al. | |
| 10,422,971 B2 | 9/2019 | Cooke et al. | |
| 10,444,456 B2 | 10/2019 | Cooke et al. | |
| 10,459,184 B2 | 10/2019 | Cooke et al. | |
| 10,473,874 B2 | 11/2019 | Smrha et al. | |
| 10,564,378 B2 | 2/2020 | Cooke et al. | |
| 10,571,640 B2 | 2/2020 | Berridge | |
| 10,606,014 B2 | 3/2020 | Cooke et al. | |
| 10,739,544 B2 | 8/2020 | Smrha et al. | |
| 10,809,480 B1 * | 10/2020 | Cox | G02B 6/4454 |
| 10,852,499 B2 | 12/2020 | Cooke et al. | |
| 10,969,553 B2 | 4/2021 | Smrha et al. | |
| 11,086,089 B2 | 8/2021 | Cooke et al. | |
| 11,092,767 B2 | 8/2021 | Cooke et al. | |
| 11,125,961 B2 | 9/2021 | Takeuchi et al. | |
| 11,228,819 B1 | 1/2022 | Takeuchi et al. | |
| 2011/0217016 A1 | 9/2011 | Mullsteff | |
| 2014/0010510 A1 | 1/2014 | Blackard | |
| 2019/0064452 A1 | 2/2019 | Zseng | |
| 2019/0391355 A1 * | 12/2019 | Berridge | G02B 6/4453 |
| 2020/0064562 A1 * | 2/2020 | Kuffel | G02B 6/3885 |
| 2020/0241227 A1 | 7/2020 | Smrha et al. | |
| 2020/0241228 A1 | 7/2020 | Smrha et al. | |
| 2020/0249408 A1 | 8/2020 | Smrha et al. | |
| 2020/0249409 A1 | 8/2020 | Smrha et al. | |
| 2020/0249410 A1 | 8/2020 | Smrha et al. | |

* cited by examiner

HIGH-DENSITY FIBER MANAGEMENT SYSTEM

CROSS-REFERENCE TO RELATED APPLICATION(S)

This application claims benefit to U.S. Provisional Patent Application No. 63/322,830, filed on Mar. 23, 2022, the entirety of which is hereby incorporated by reference herein.

FIELD OF THE TECHNOLOGY

This disclosure relates to a high-density fiber management system that enables a high density of fiber cables to be managed and/or routed within a known dimensional area such as, for example, a rack unit "RU" of space.

BACKGROUND

Optical fibers allow for transmission of communications over longer distances and at higher bandwidths than wire cables. Optical fibers are also advantageous for communication systems because signals suffer less loss than wire cables and are immune to electromagnetic interference. Optical fibers are therefore often used for high bandwidth, long distance applications. One of the primary functions of a data center is to provide connections between incoming and outgoing optical fiber connections. For example, a fiber management system may be used to provide fiber cable interconnections within a data center environment.

SUMMARY

This disclosure provides a high-density fiber management system based on a patch panel design. The high-density fiber management system may allow, for example, 144 connections/RU, 192 connections/RU, or other high densities within an RU space.

According to an embodiment, a fiber management system is disclosed. The fiber management system comprising: a patch panel including a plurality of mounting openings, the patch panel configured to fit within a Rack Unit (RU) space; and a module including a plurality of openings at a front side, the plurality of openings configured to support fiber optic connecters, the module configured to fit within the mounting openings, wherein when the patch panel is fully mounted by a plurality of modules the patch panel supports at least 144 fiber connections per RU.

According to an embodiment, a fiber management system is disclosed. The fiber management system comprising: a patch panel configured to fit within a Rack Unit (RU) space, the patch panel including a plurality of mounting openings; and a module including a plurality of openings at a front side, the plurality of openings configured to support fiber optic connecters, the module configured to fit within the mounting openings, wherein when the patch panel is fully mounted by a plurality of modules the patch panel supports at least 192 fiber connections per RU.

BRIEF DESCRIPTION OF THE DRAWINGS

The following detailed description references the drawings, wherein.

DETAILED DESCRIPTION

This disclosure describes embodiments of a high-density fiber management system that enables a high density of fiber cables to be managed and routed within a known dimensional area (e.g., rack unit "RU").

Figure 1:
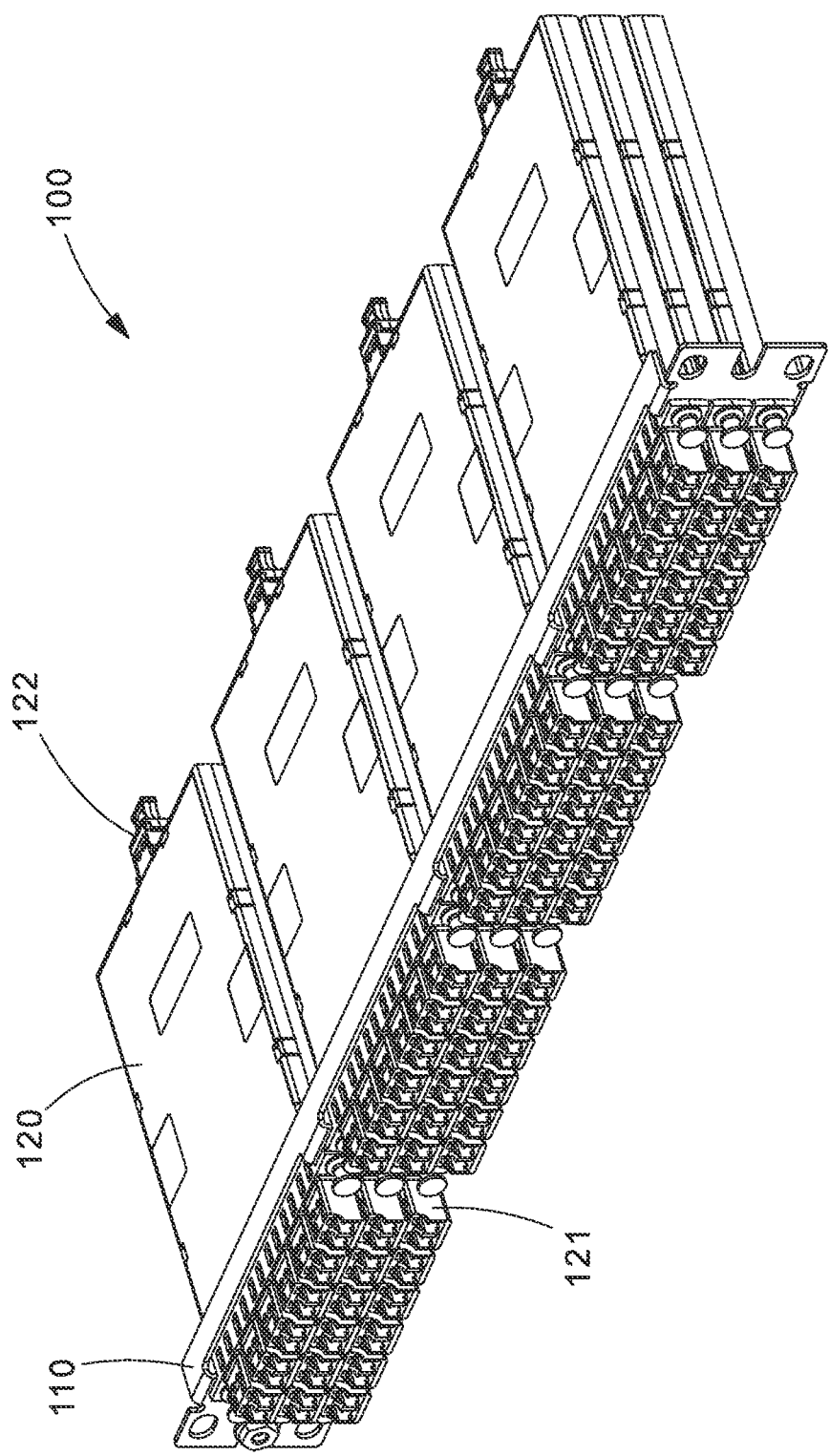
FIG. 1 is a perspective view of a modular patch panel including installation of up to 12 cassettes mounted to a front side of the patch panel, according to an embodiment.

FIG. 1 shows a perspective view of a patch panel system 100 that includes a patch panel 110 for directly mounting onto a rack, where the patch panel 110 is configured to mount up to twelve (12) cassettes 120 where each cassette 120 is configured to include up to 12 fiber connections using LC duplex adapters. The patch panel 110 has dimensions that fit a 1 RU space within the rack. When all 12 cassettes 120 are fully populated and mounted to the patch panel 110, this enables up to 144 fiber connections per RU space, according to an embodiment. Each of the cassettes 120 are configured to include 6 individual front-side openings 127 (see e.g., opening 127 in FIG. 4), where each of the front-side openings 127 may accept a front side adapter 121 (e.g., duplex LC adapter). When the patch panel 110 is fully mounted with 12 fully fiber populated cassettes 120, the patch panel 110 may include up to 72 duplex LC adapters front side adapters 121 that provide up to 144 fiber connections in the RU space. The cassette 120 also includes a rear adapter 122 (e.g., MPO adapter) that is installed into a rear opening, where the rear adapter 122 is configured to hold fiber connections to the fibers connected to the front side adapter 121.

Figure 2:
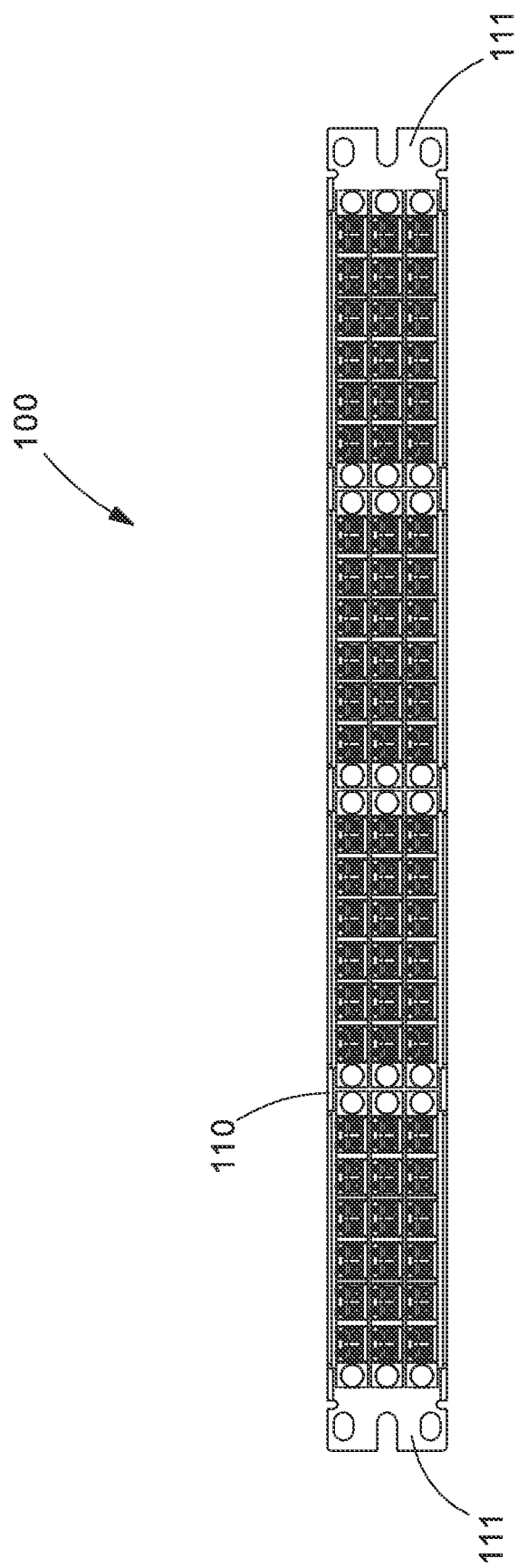
FIG. 2 is a front side view of the patch panel shown in FIG. 1.

FIG. 2 shows a front-side view of the patch panel system 100, where 12 cassettes 120 are installed onto the patch panel 110 and arranged into 3 rows and 4 columns. The front-side of the patch panel 110 includes mounting flanges 111 at either end that include mounting holes 117 for using fasteners to mount the patch panel 110 to a rack.

Figure 3:
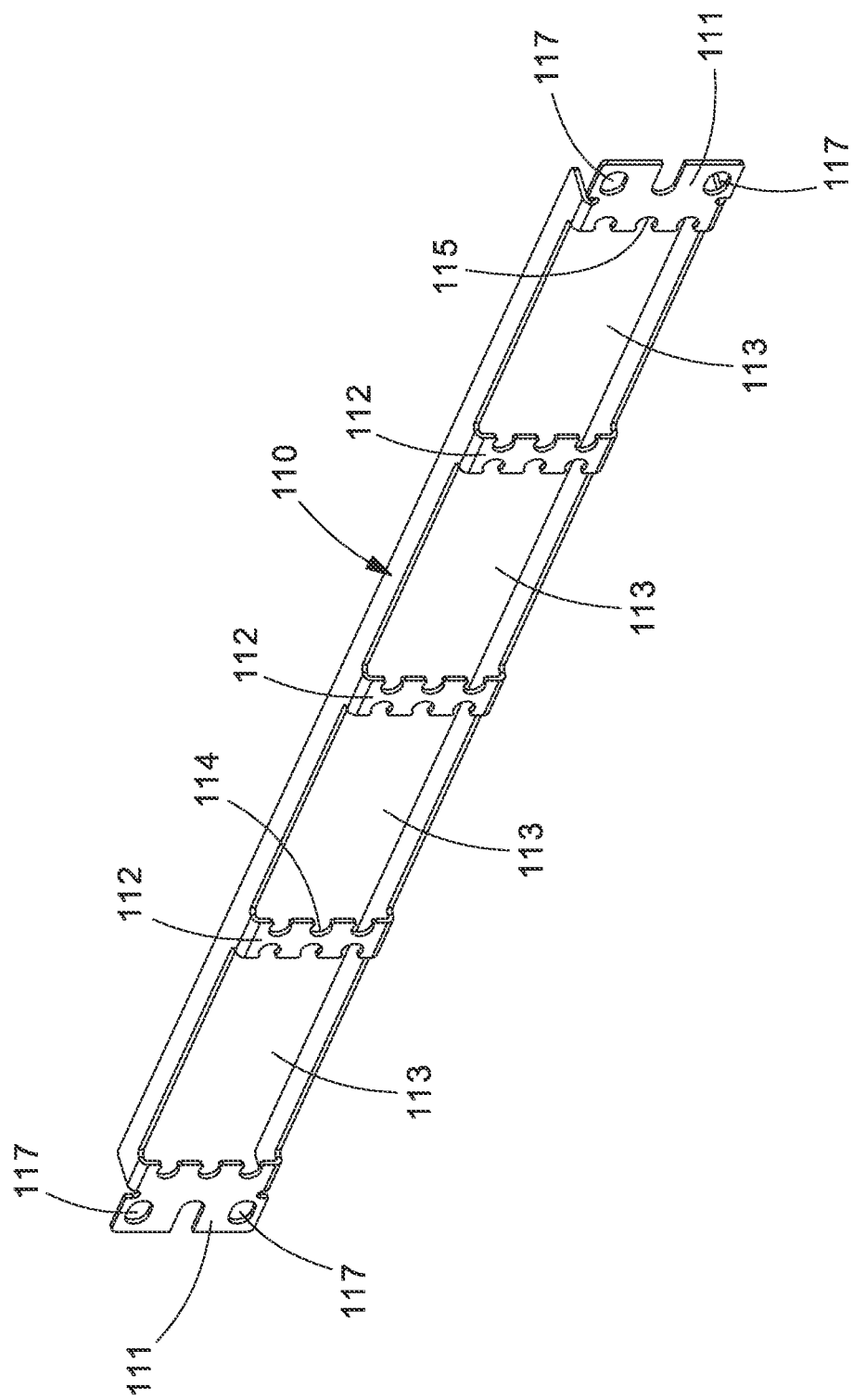
FIG. 3 is a perspective view of the patch panel shown in FIG. 1, where the patch panel is not yet populated with any installed cassettes.

In FIG. 3 the patch panel 110 is shown without having any cassettes 120 installed. Without the cassettes 120 installed, the patch panel 110 is shown to include 4 openings 113 that are defined by 3 divider columns 112 and the inner sides of the flanges 111 that include mounting features 114, 115 for mounting the cassettes 120 into the openings 113. Each opening 113 is configured to accept up to 3 cassettes 120 mounted into a column.

Figure 4:
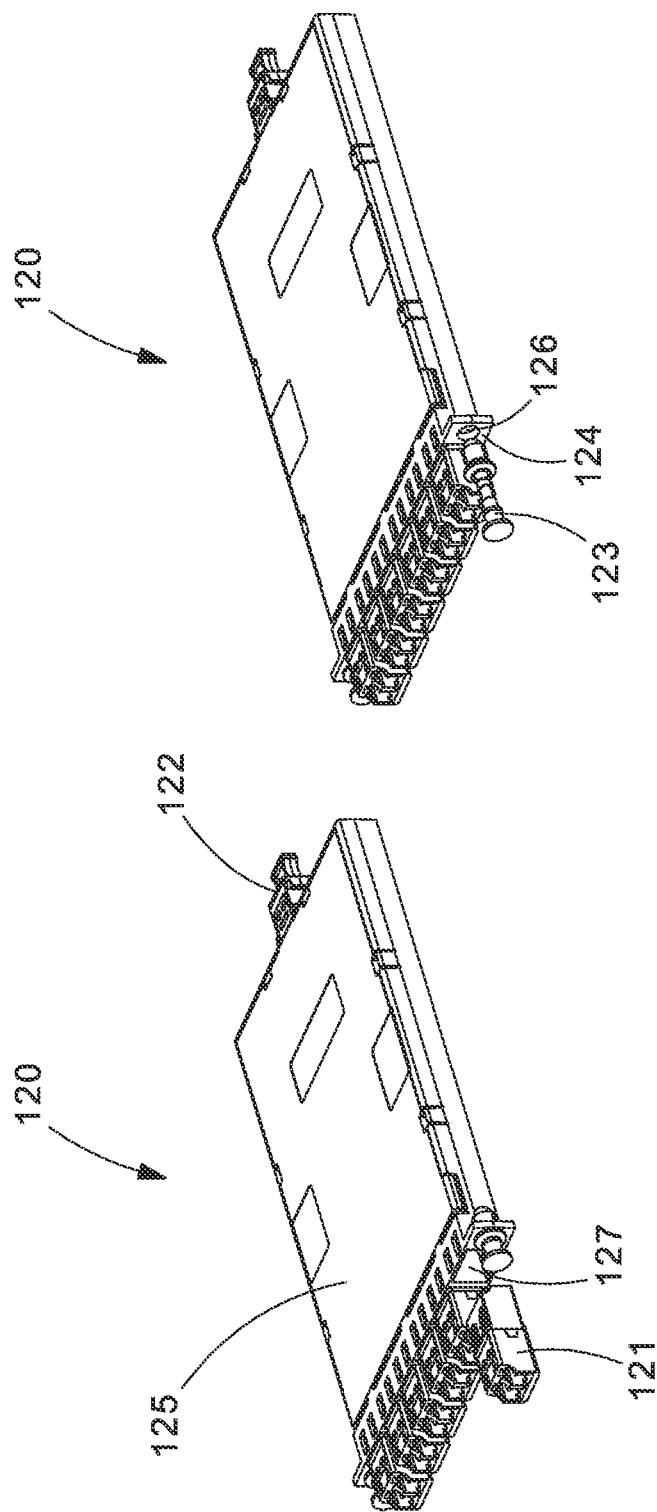
FIG. 4 is a perspective view of cassettes for installation into the patch panel shown in FIG. 1.

FIG. 4 shows two exemplary cassettes 120 in various states of exploded views to show the different components. Both cassettes 120 shown in FIG. 4 include a main housing body 125. In the cassette 120 shown to the left, the front side adapter 121 is shown to be disengaged from an installed state to better show how the front side adapter 121 fits into the opening 127 on the front-side of the cassette 120. In the cassette 120 shown to the right, a fastener 123 (e.g., push pins) is shown disengaged from an installed state to better show how the fastener 123 fits into the mount opening 126 in the cassette flange 124. The fastener 123 may be preinstalled into the mount opening 126 in the cassette flange 124, while in other embodiments the fastener 123 may not be pre-installed.

To install the cassettes onto the patch panel 110, a rear of the cassette 120 is first inserted into an opening 113 until the cassette flange 124 abuts against the mounting features 114, 115 of the divider columns 112 and/or patch panel flanges 111. When the mount openings 126 line up to the mounting features 114, 115, the fastener 123 is inserted through the mount opening 126 and the mounting features 114, 115 until it is securely engaged to ensure the cassette 120 is securely mounted to the front of the patch panel 110. As described, the patch panel 110 also includes its own flanges 111 that are used to mount the patch panel 110 to a rack (e.g., telecom equipment rack, cabinet, enclosure, or other mountable equipment).

Figure 5:
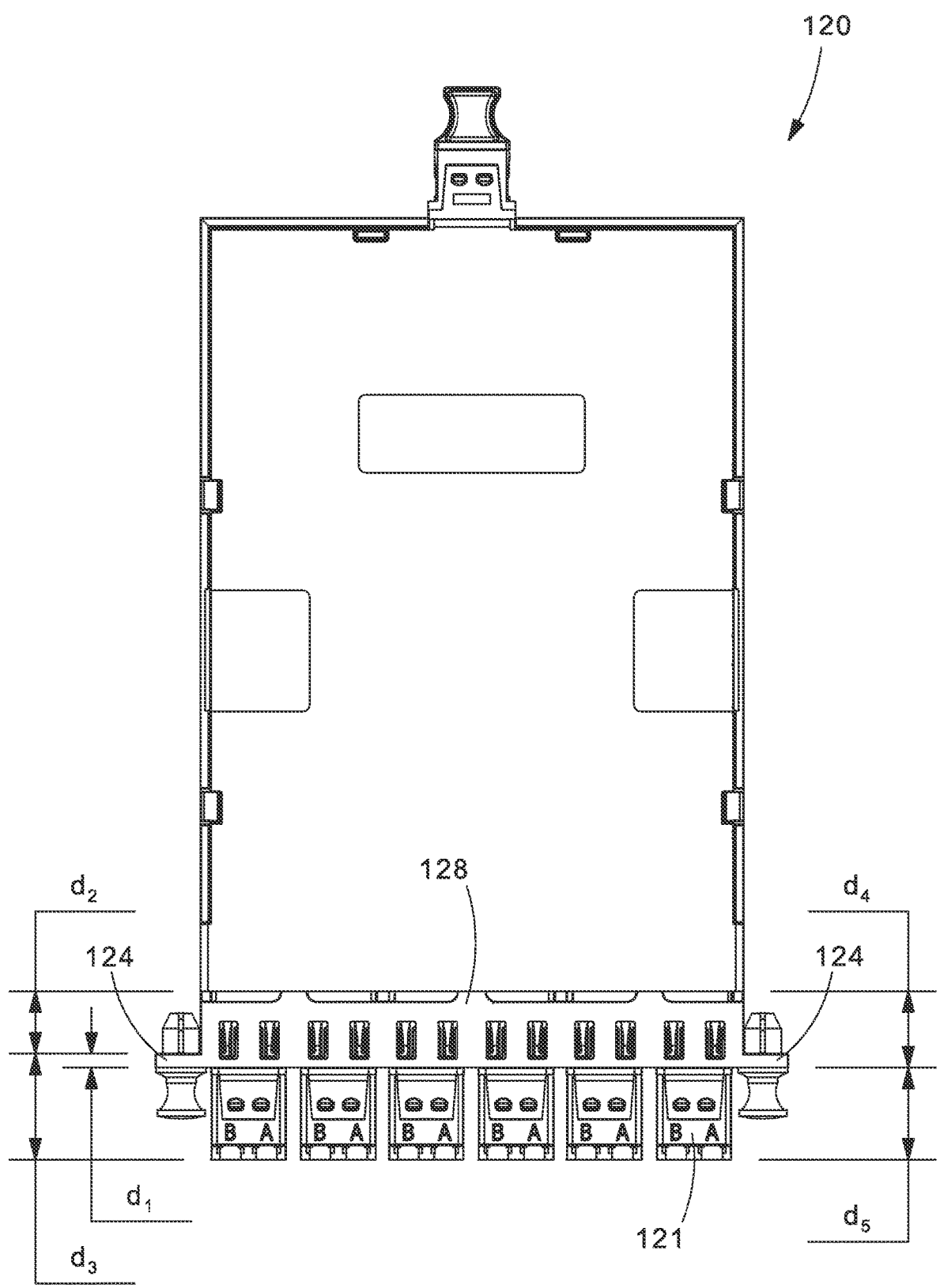
FIG. 5 is a top-down view of a cassette installed into the patch panel shown in FIG. 1.

FIG. 5 is a top-down view of the cassette 120 that provides dimensional measurements for specific features of the cassette 120 where duple LC adapters have been installed into it as the front side adapters 121. The dimensions provided in FIG. 5 are inches (mm). For example, a thickness of the cassette flange 124 may be measured as $d_1$ being 0.093 inches (2.36 mm), a depth of the front-side of the cassette 120 behind the cassette flange 124 may be measured as $d_2$ being 0.437 inches (11.09 mm), a depth that measures the cassette flange 124 to the front side adapter 121 may be measured as $d_3$ being 0.713 inches (18.11 mm), a depth of a front-side panel 128 of the cassette 120 behind the flange 124 (including the thickness of the cassette flange 124) may be measured as $d_4$ being 0.530 inches (13.46 mm), and a depth of the front side adapter 121 may be measured as $d_5$ being 0.620 inches (15.75 mm).

Figure 6:
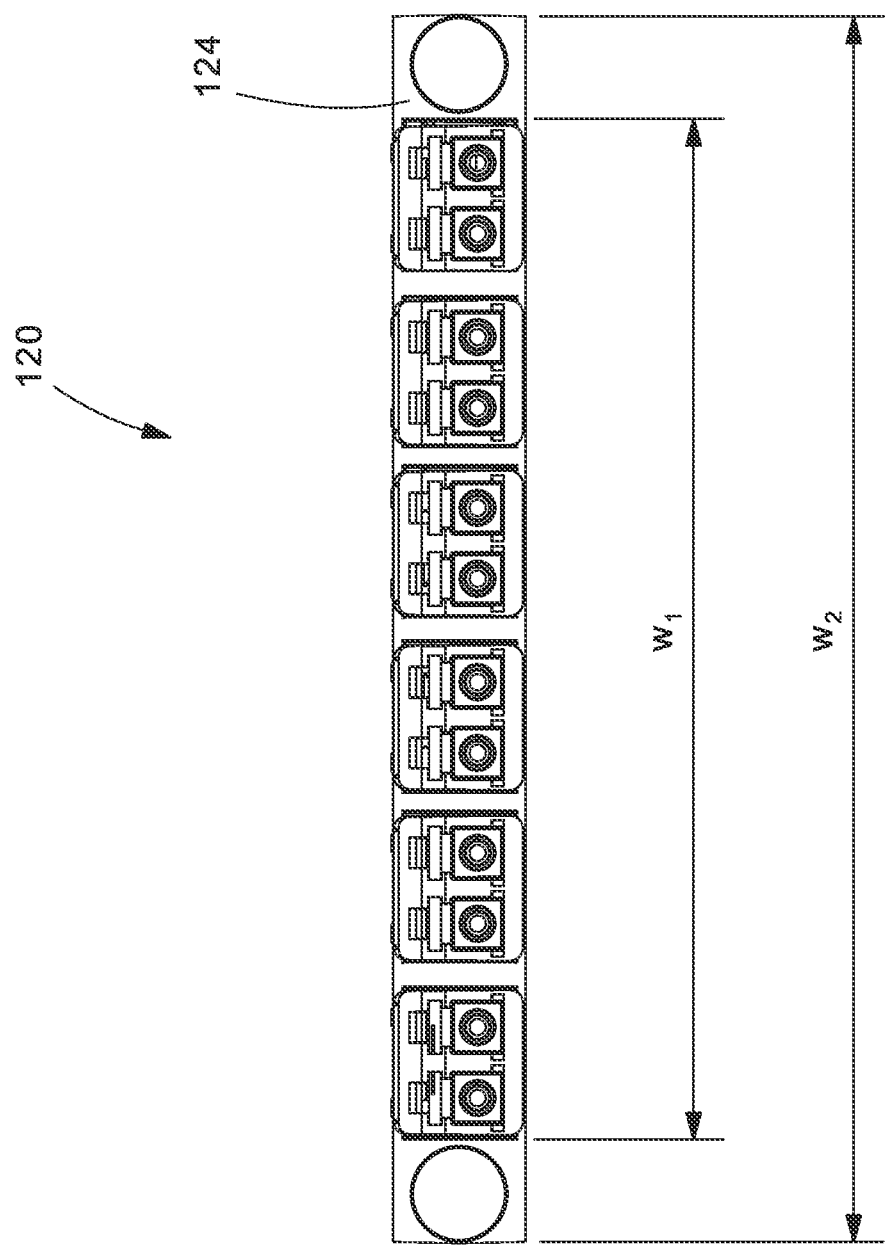
FIG. 6 is a front side view of a cassette installed into the patch panel shown in FIG. 1, where the cassette includes connector adapters installed into openings of the cassette.

FIG. 6 is a front-side view of the cassette 120, that includes certain dimensional measurements. For example:

$W_1 > 90$ mm (3.543 inches), where $W_1$ is measured from end-to-end of the front-side openings 127.

$W_2 > 105.882$ mm (4.169 inches), where $W_2$ measures a front face that is measured from end-to-end of the cassette flanges 124.

Figure 7:
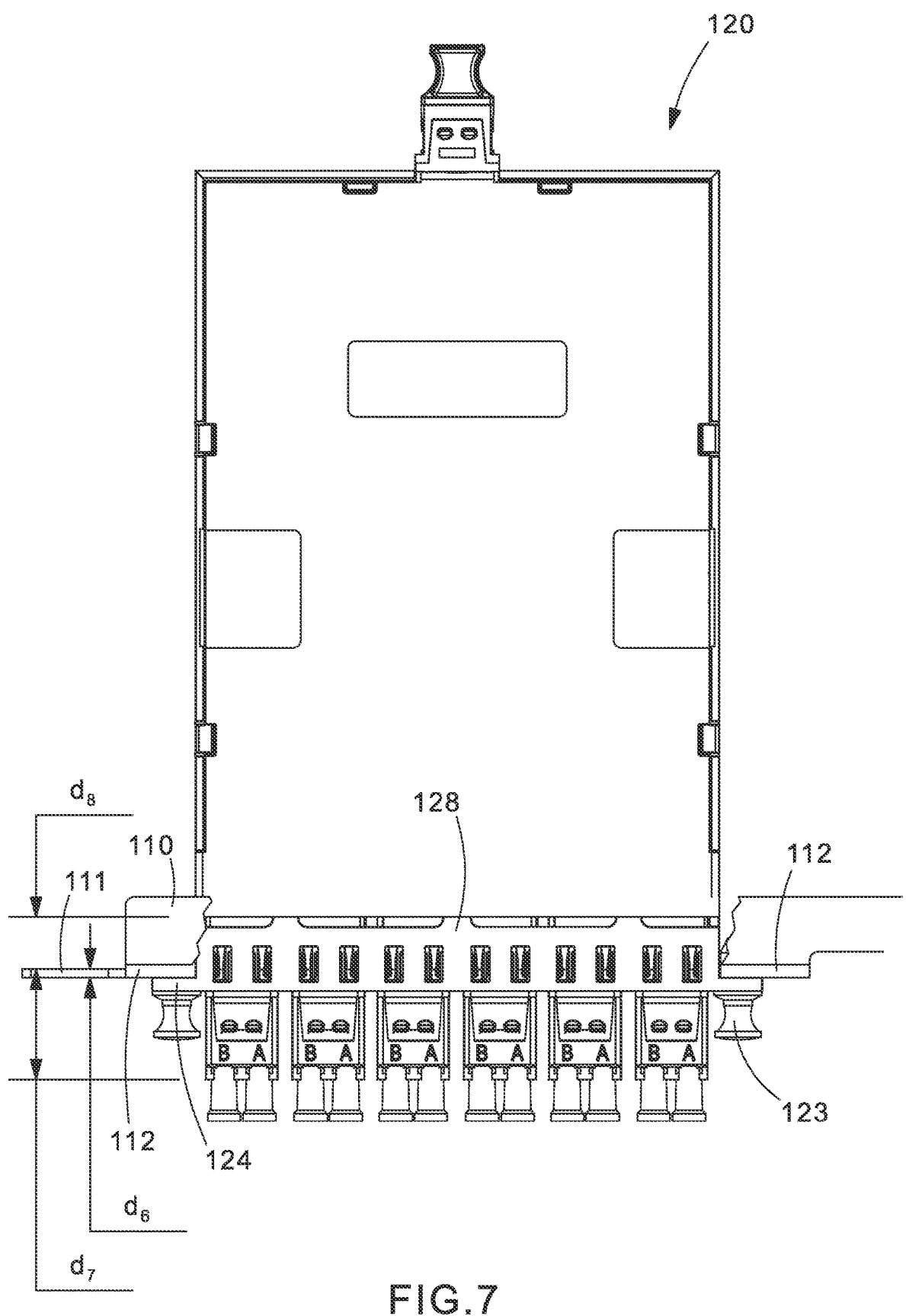
FIG. 7 is a top-down view of a cassette installed onto the patch panel shown in FIG. 1, where the cassette includes connector adapters installed into openings of the cassette.

FIG. 7 is a top-down view of the cassette 120 mountedly installed onto the patch panel 110, where a portion of the patch panel 110 over the cassette 120 has been visually removed to show how the cassette 120 fits into the patch panel 110 when installed. The dimensions provided in FIG. 7 are inches (mm). For example, a thickness of the patch panel flanges 111 may be measured as de being 0.060 inches (1.52 mm), a depth from the patch panel flanges 111 to a front of the front side adapter 121 (including the thickness of the patch panel flange 111) may be measured as $d_7$ being 0.773 inches (19.63 mm), and a depth from the patch panel flanges 111 back to a rear end of the front-side panel 128 (not including the thickness of the patch panel flange 111) may be measured as da being 0.377 inches (9.57 mm).

Figure 8:
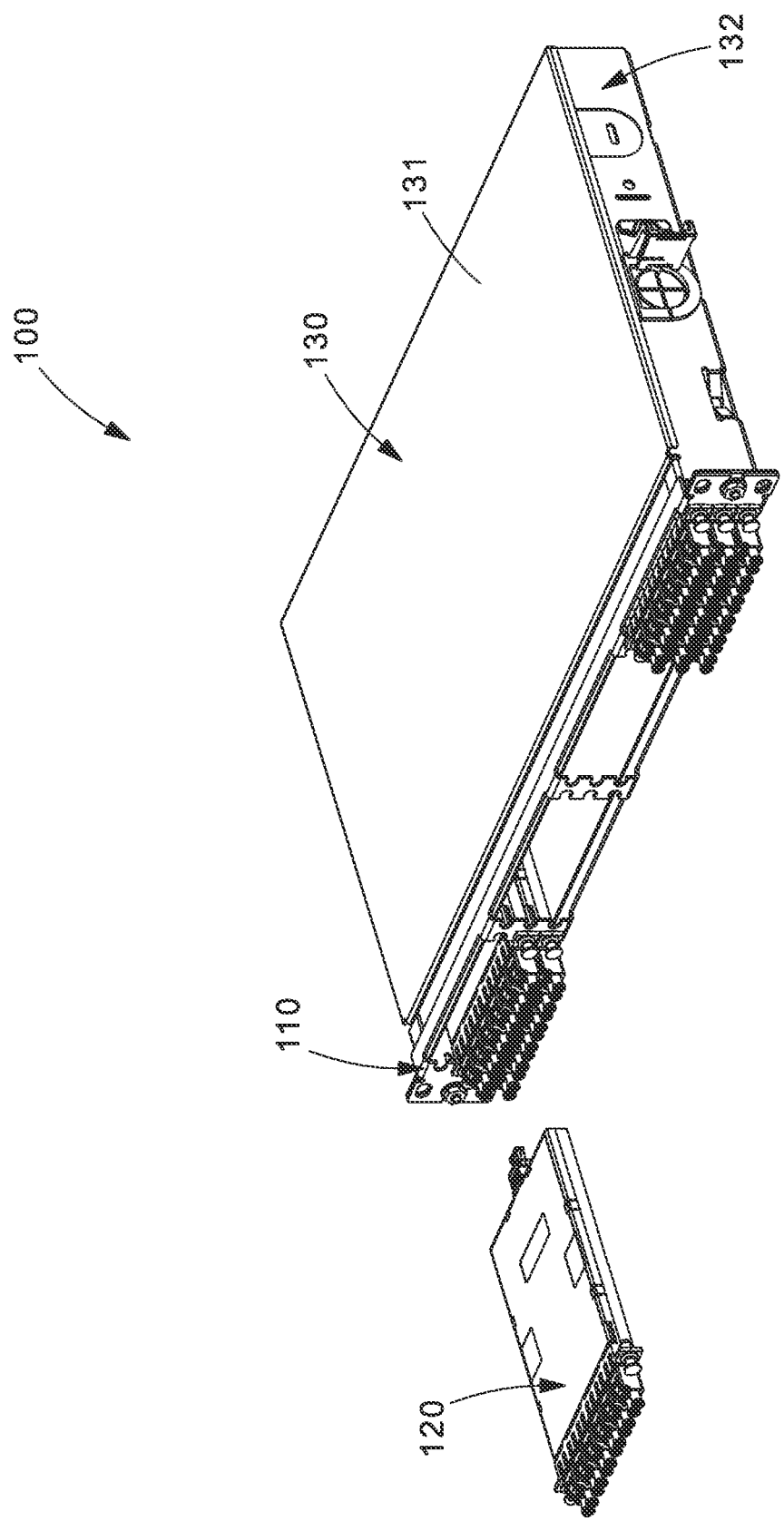
FIG. 8 is a perspective view of the patch panel shown in FIG. 1 mounted onto an enclosure, according to an embodiment.

FIG. 8 is a perspective view of the patch panel system 100 including the cassette 120 and the patch panel 110, where the patch panel system 100 is now mounted into an enclosure 130, according to another embodiment. The enclosure 130 includes a top cover 131 and a base 132. The top cover 131 may be fitted and secured to the base 132.

Figure 9:
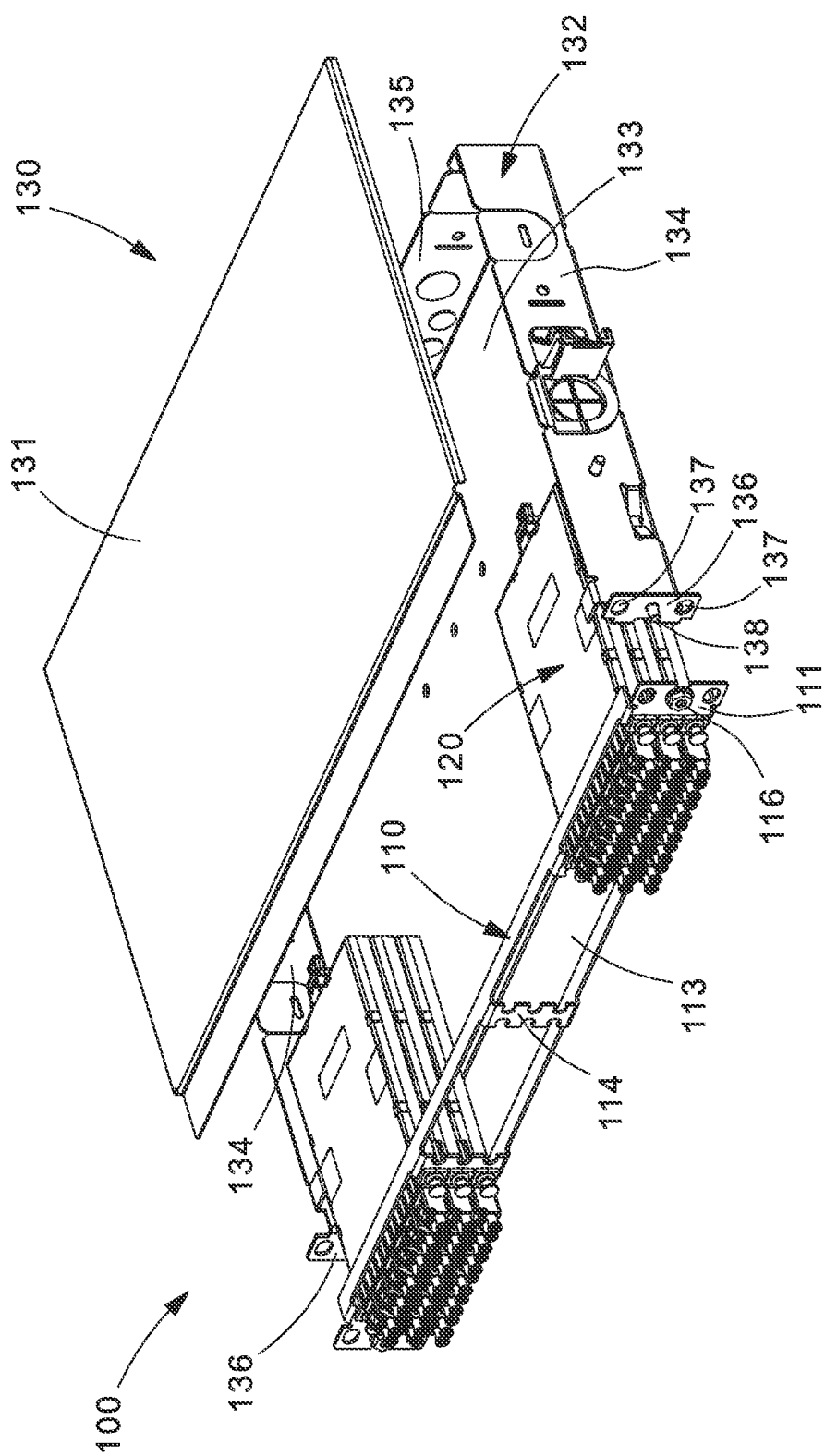
FIG. 9 is a partially exploded view of the patch panel and enclosure shown in FIG. 8, where a top cover of the enclosure is shown detached from the enclosure.

FIG. 9 is a partially exploded perspective view of the patch panel system 100 installed into the enclosure 130. As shown in FIG. 9, the base 132 is comprised of a bottom 133, side walls 134, a rear wall 135, and attached or incorporated mounting flanges 136. The top and front locations of the enclosure 130 may be generally open when the top cover 131 and patch panel 110, respectively, are not installed.

The mounting flanges 136 are attached to, or incorporated into, the enclosure's base 132, and are utilized to mount and dismount the enclosure onto mounting rails of a rack or cabinet (not shown), where the mounting flanges 136 include holes 137 for fasteners (not shown) to pass through to secure the enclosure 130 to the rack/cabinet. In this embodiment shown in FIG. 9, the mounting flanges 136 also include an optional threaded post 138 for engaging with a nut 116, to secure the patch panel 110 to the enclosure 130 prior to mounting the enclosure 130 to the rack/cabinet. The holes 137 allow portions of a fastener, such as the threaded portion of a screw, to pass through so they can be united with the rack/cabinet and tightened to secure the enclosure 130 to the rack/cabinet. The threaded post 138 may be incorporated into the enclosure mounting flanges 136 to enable the patch panel 110 to be secured to the enclosure 130 with a fastener such as the nut 116 as shown in this embodiment illustrated in FIG. 9. The nut 116 is used in conjunction with the threaded post 138 to secure the patch panel 110 to the enclosure 130.

According to some embodiments, an installation process for installing the patch panel 110 into the enclosure 130 may include:
1. Sliding the patch panel 110 (with or without cassettes 120 installed) into the front of the enclosure 130.
2. Using the nuts 116, secure the patch panel 110 to the front of the enclosure 130 using the threaded posts 138.
3. Placing the assembly including the patch panel 110 installed onto the enclosure 130, into the rack/cabinet.
4. Line up the holes in the patch panel flanges 111 with the enclosure mounting holes 137, placing fasteners through the holes in the patch panel flanges 111 and enclosure mounting holes 137, and tightening the fasteners to secure the assembly to the rack/cabinet.
5. Adding cassettes 120 to the patch panel 110 and cabling to the enclosure 130, as desired.
6. Attaching the top cover 131 to the enclosure base 132.

According to other embodiments, different assembly sequences are possible. For example, steps 5 and 6 could be completed before step 4.

Figure 10:
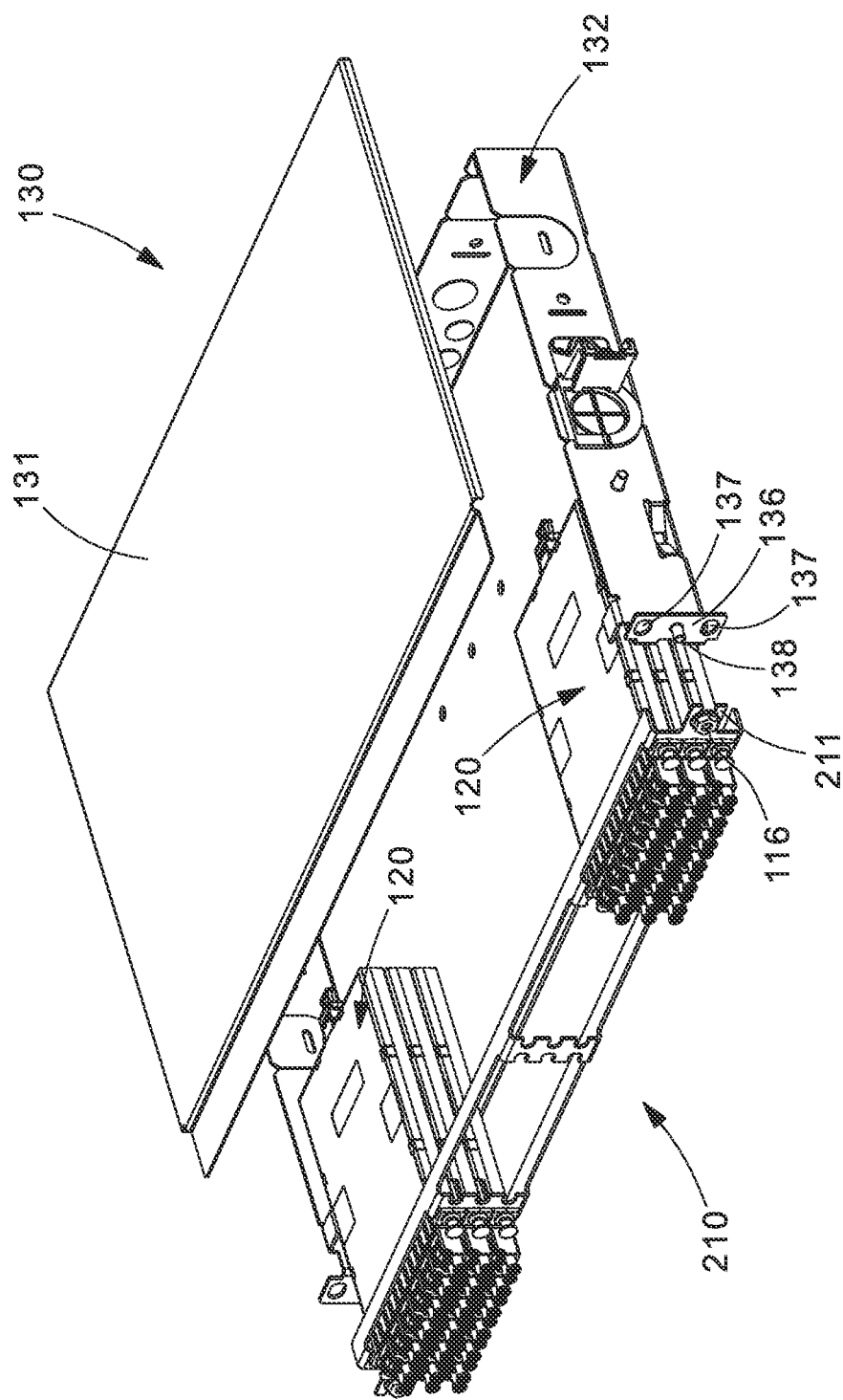
FIG. 10 is a partially exploded perspective view of an alternative patch panel mounted onto an enclosure, where the alternative patch panel is similar to the patch panel shown in FIG. 1 but includes a different design for its patch panel flange for mounting the patch panel to the enclosure.

FIG. 10 shows an alternative embodiment of a patch panel 210, where patch panel 210 is the same as patch panel 110 other than a different design for mounting flanges 211 that are relieved to omit the mounting holes when compared to the mounting flanges 111 from patch panel 110.

An installation process for installing the patch panel 210 into the enclosure 130 may include:
1. Sliding the patch panel 210 into the front of the enclosure 130.
2. Using the nuts 116, secure the panel 210 to the front of the enclosure 130 using the threaded posts 138.
3. Placing the assembly including the patch panel 210 and the enclosure 130 in the rack/cabinet.
4. Placing fasteners through the enclosure mounting holes 137 and tightening to secure the assembly to the rack/cabinet.
5. Add modular cassettes 120 and cabling as required to the patch panel 210 and enclosure 130.
6. Attach the cover 131 to the enclosure base 132.

The alternate mooting flange provided by patch panel 210 allows it to be removed from the enclosure 130 by simply removing the nuts 116, which saves an installer from having to first remove the enclosure 130 from the rack. According to other embodiments, different assembly sequences are possible. For example, steps 5 and 6 could be completed before step 4.

Figure 11:
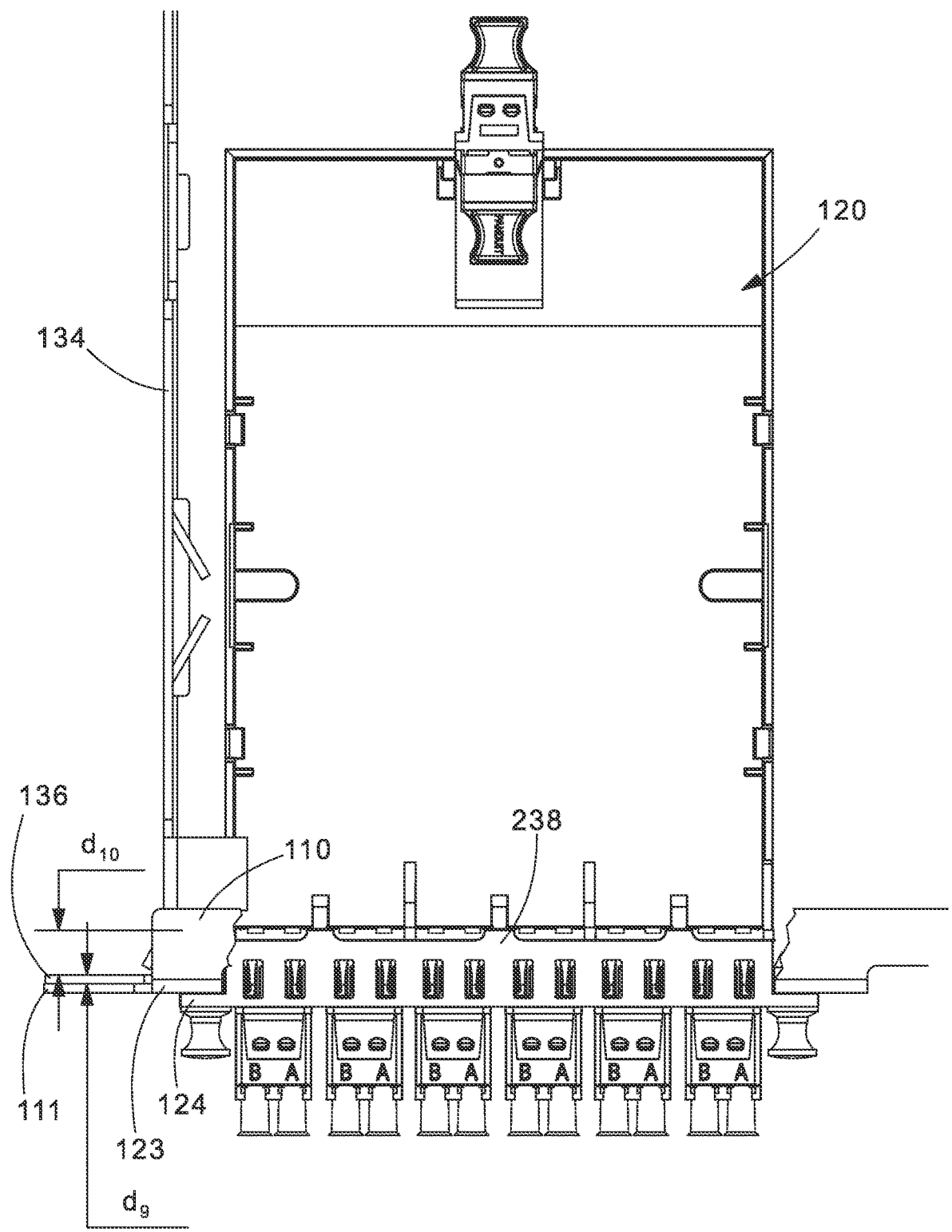
FIG. 11 is a top-down partial view of a cassette installed into the patch panel and mounted onto the enclosure shown in FIG. 8.

FIG. 11 is a top-down view of the patch panel system 100 in the assembled state that shows the patch panel 110 having cassette 120 installed, similar to the view from FIG. 7, however in FIG. 11 the patch panel system 100 is additionally mounted into the enclosure 130. The dimensions provided in FIG. 11 are inches (mm). So in addition to the measurements provided in FIG. 7, FIG. 11 additionally shows a thickness of the enclosure mounting flange 136 as do being 0.060 inches (1.52 mm), and a distance from the enclosure mounting flange 136 back to a rear of the front-side panel 128 as $d_{10}$ being 0.317 inches (8.05 mm). All other distances from FIGS. 5 and 7 relating to the patch panel 110 and cassette 120 are applicable to the patch panel system 100 mounted into the enclosure 130 shown in FIG. 11.

Figure 12:
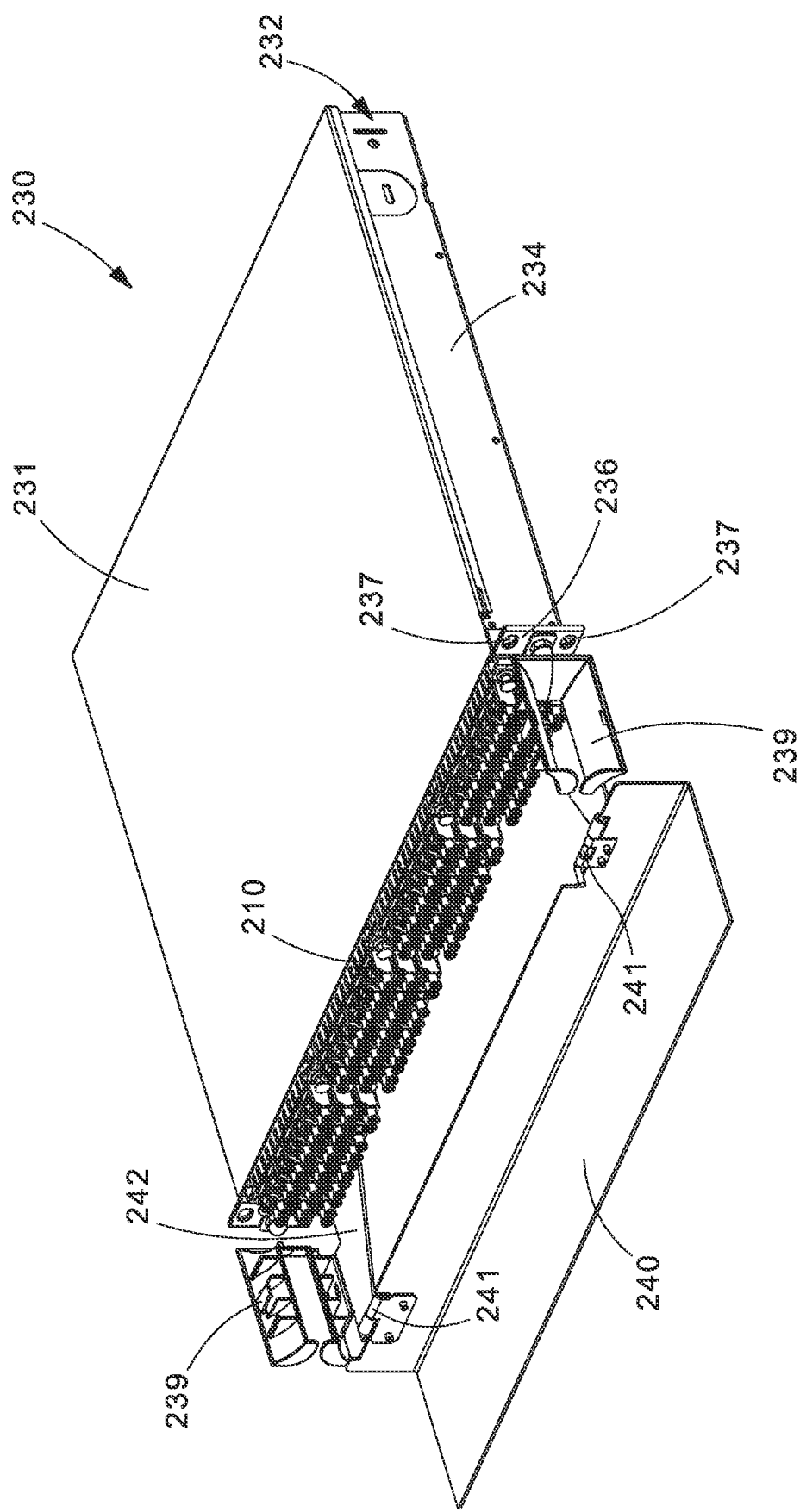
FIG. 12 is a perspective view of the patch panel shown in FIG. 10 mounted to an alternative enclosure that includes a sliding tray, according to another embodiment.
Figure 13:
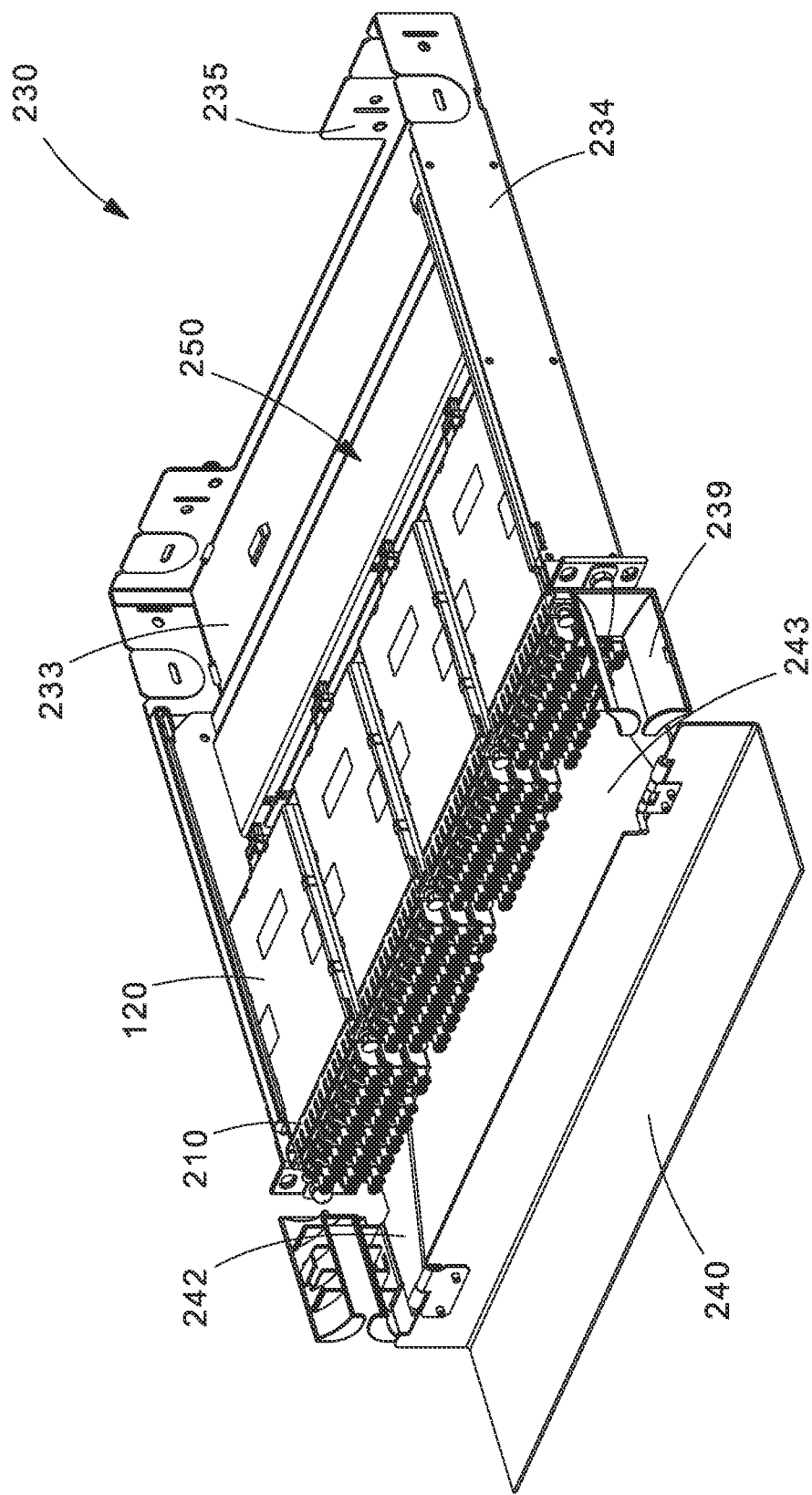
FIG. 13 is a perspective view of the patch panel shown in FIG. 12 where a top cover to the enclosure has been removed to show internal components to the enclosure.

FIG. 12 is a perspective view that shows patch panel 210 mounted to an alternative enclosure 230, the enclosure 230 including cable management features 239 in the front of the enclosure 230 and a sliding tray 250 for sliding the patch panel 210 into, and out of, the enclosure 230 along a lateral axis. The enclosure 230 also includes a removable top cover 231 and a base 232, where the base 232 includes side walls 234, an enclosure floor 233 (as shown in FIG. 13), and a rear wall 235 (as shown in FIG. 13). The enclosure also includes enclosure mounting flanges 236, where the mounting flanges includes holes 237. The enclosure 230 also includes a front cover 240, where in FIG. 12 the front cover 240 is shown in a rotated down state. The front cover 240 attaches to the tray 250 via hinges 241 that rotatably attach to arms 242. Between the arms is an opening 243 that enables installers to access the cassettes 120 from the bottom of the enclosure 230.

Figure 14:
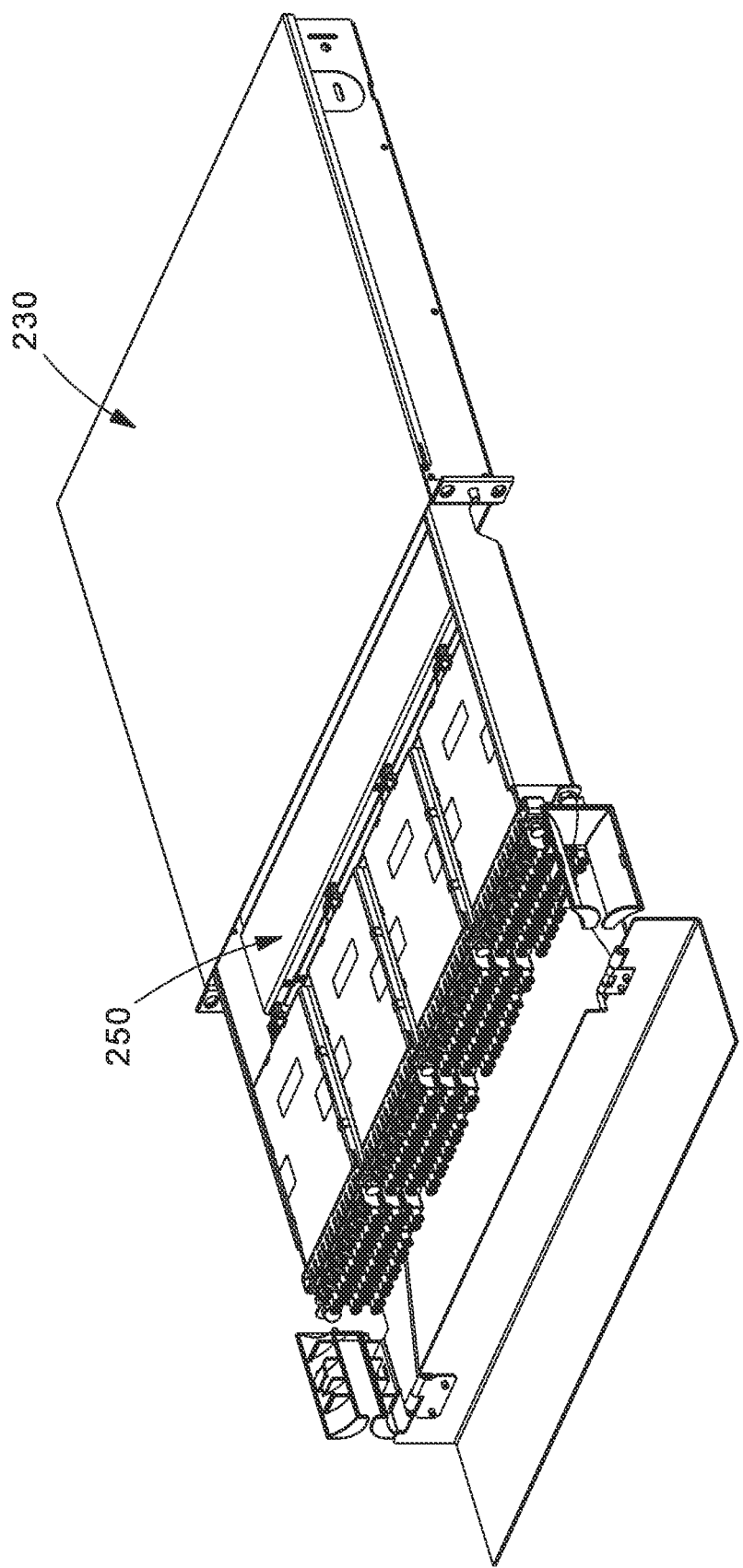
FIG. 14 is a perspective view of the patch panel shown in FIG. 12 where the sliding tray has been extended out to an extended position, according to some embodiments.
Figure 15:
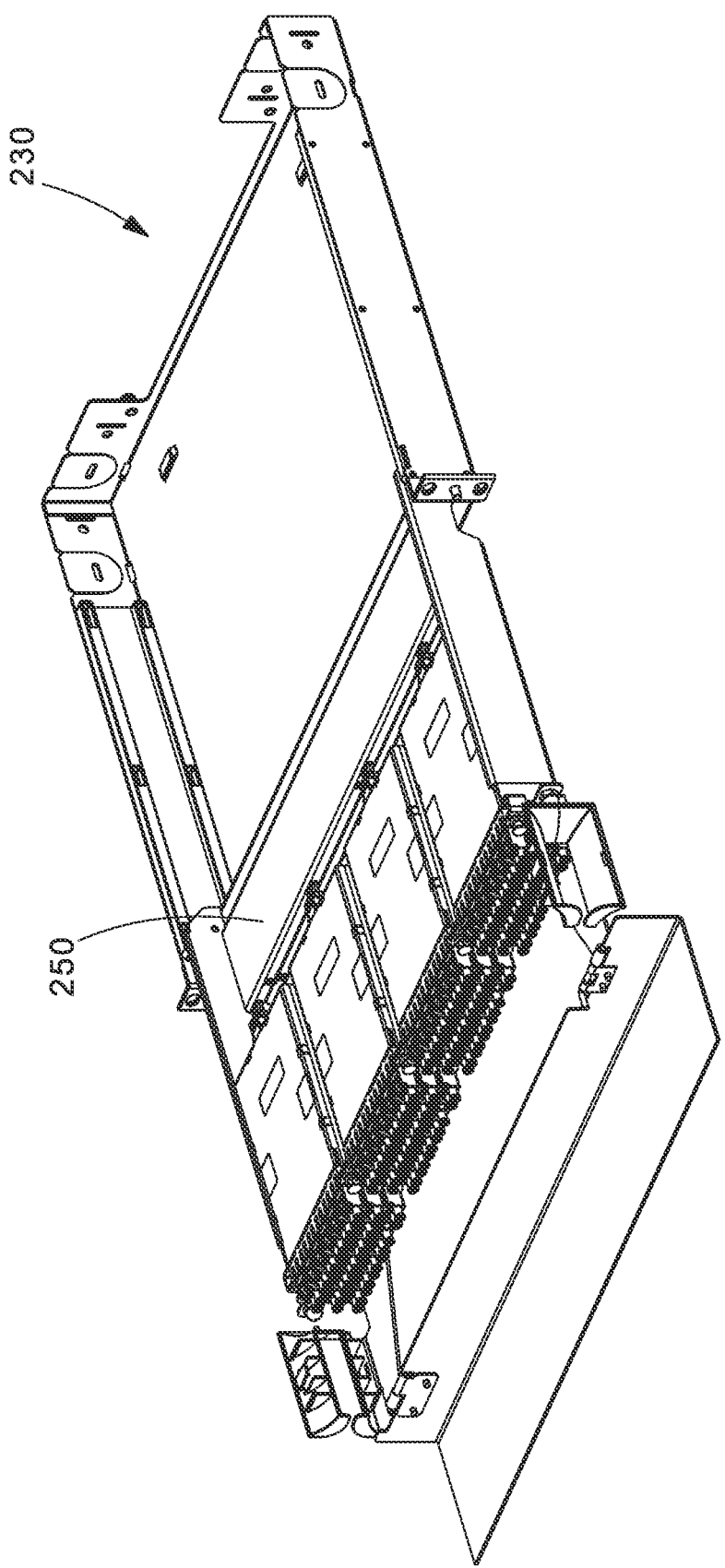
FIG. 15 is a perspective view of the patch panel shown of the patch panel shown in FIG. 12 where the sliding tray has been extended out to an extended position, and a top cover has been removed to show internal components to the enclosure.

FIG. 13 shows the enclosure 230 from FIG. 12 having the top cover 231 removed to show the internal components to the enclosure 230. FIG. 14 shows the enclosure 230 from FIG. 12 where the tray 250 is extended out to an extended position. FIG. 15 shows the enclosure 230 from FIG. 12 where the tray 250 is extended out to an extended position and the top cover 231 is removed to show the internal components to the enclosure 230.

Figure 16:
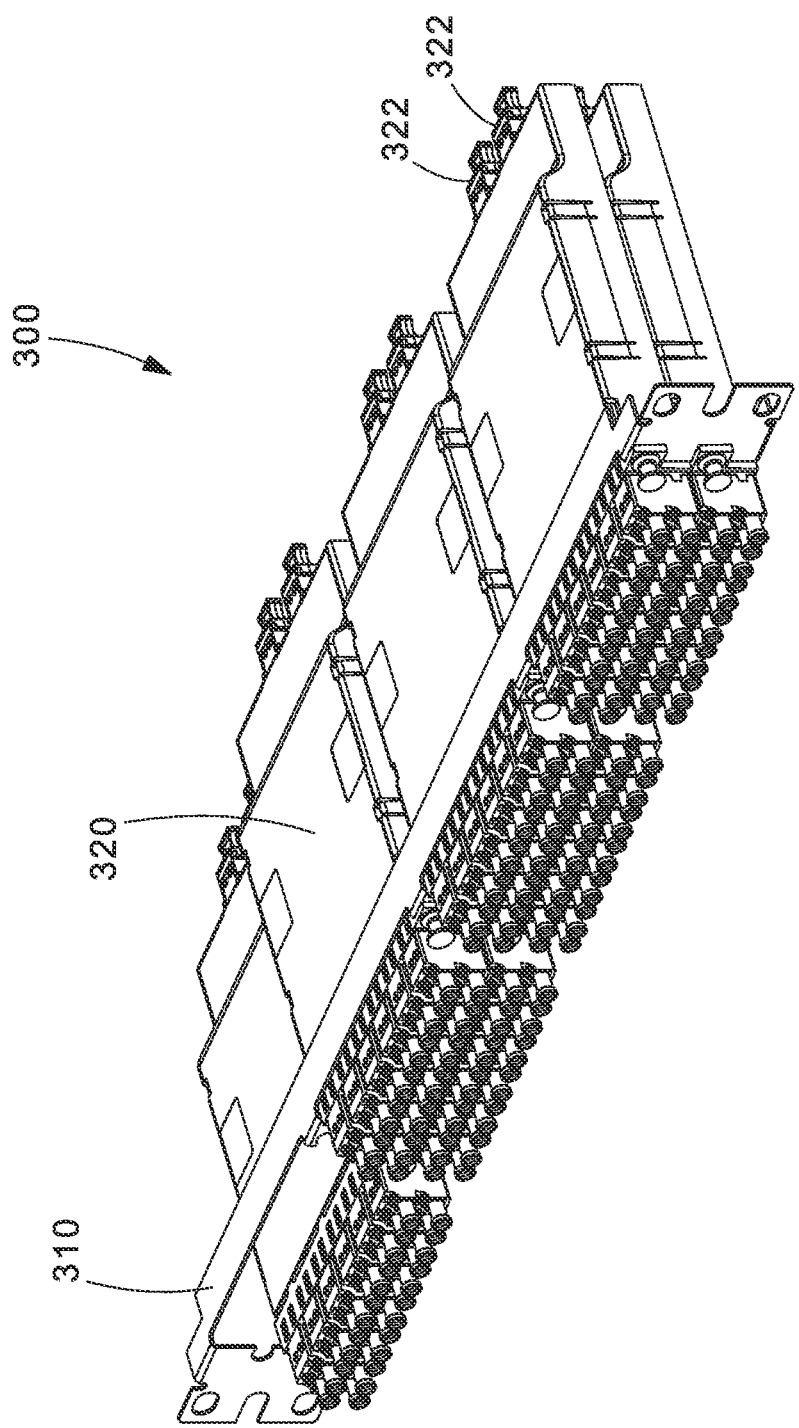
FIG. 16 is a perspective view of a modular patch panel including installation of up to 8 cassettes mounted to a front side of the patch panel, according to another embodiment.

FIG. 16 shows a perspective view of a patch panel system 300 that includes a patch panel 310 and mounted cassettes 320, where the patch panel 310 is configured to mount up to eight (8) cassettes 320 where each cassette 320 is configured to include up to 24 fiber connections using stacked double high LC duplex adapters, according to another embodiment. The patch panel 320 has dimensions that fit a 1 RU space, and the rack is made for directly mounting onto a rack or cabinet. When all 8 cassettes 320 are fully populated and mounted to the patch panel 310, this enables up to 192 fiber connections per RU. Each of the cassettes 320 are configured to include 6 individual double high front-side openings 327 (see e.g., opening 327 in FIG. 19), where each of the front-side openings 327 may accept a front side adapter 321 (e.g., stacked double high duplex LC adapter shown in FIG. 19, may also be references as "adapter array"). When the patch panel 310 is fully mounted with 8 fully fiber populated cassettes 320, the patch panel 310 may include up to 48 front side adapters 321 that provide up to 192 fiber connections in the RU space. The cassette 320 also includes at least two rear adapters 322 (e.g., MPO adapters) that are installed into a rear opening, where the rear adapter 322 is configured to hold fiber connections to the fibers connected to the front side adapter 321.

Figure 17:
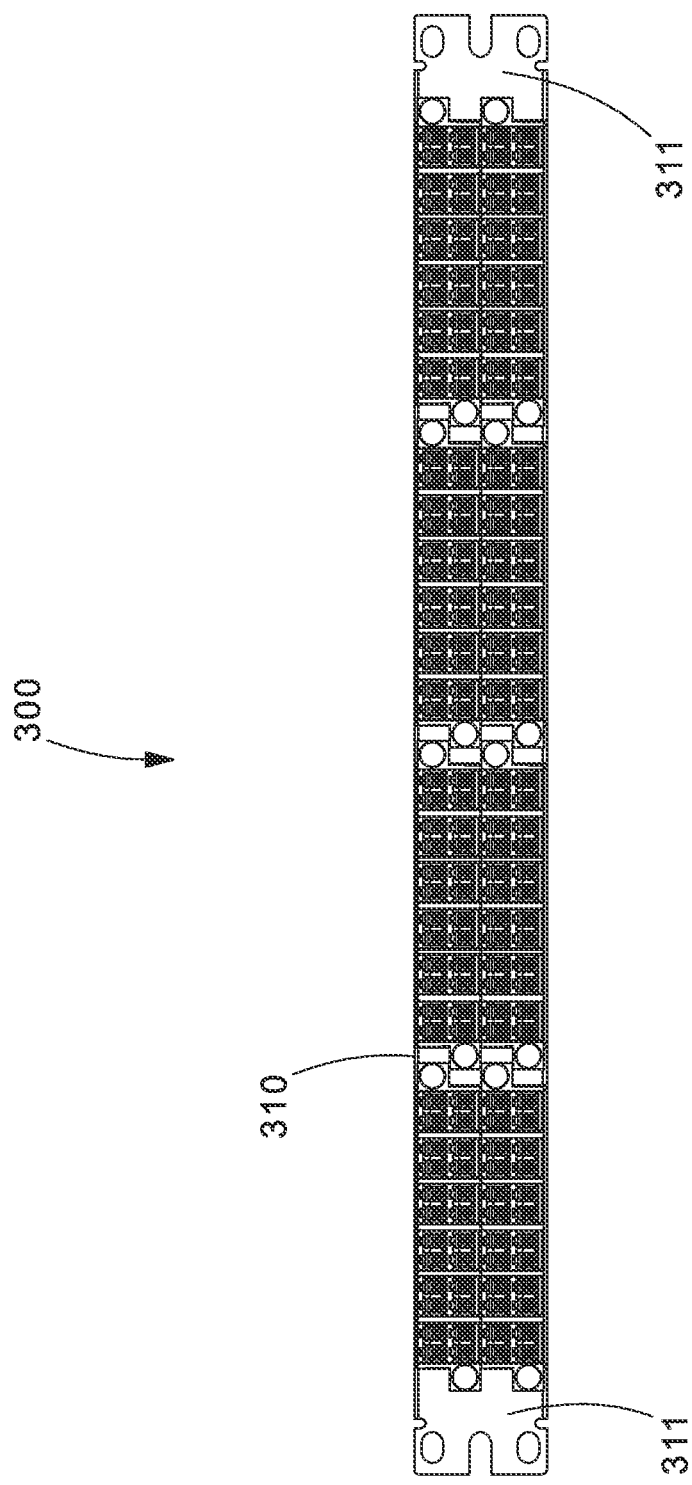
FIG. 17 is a front side view of the patch panel shown in FIG. 16.

FIG. 17 shows a front-side view of the patch panel system 300, where 8 cassettes 320 are installed into the patch panel 310 and arranged into 2 rows and four columns, and each of the cassettes 320 are shown to be fully populated with the stacked double high LC duplex adapters as the front side adapters 321.

Figure 18:
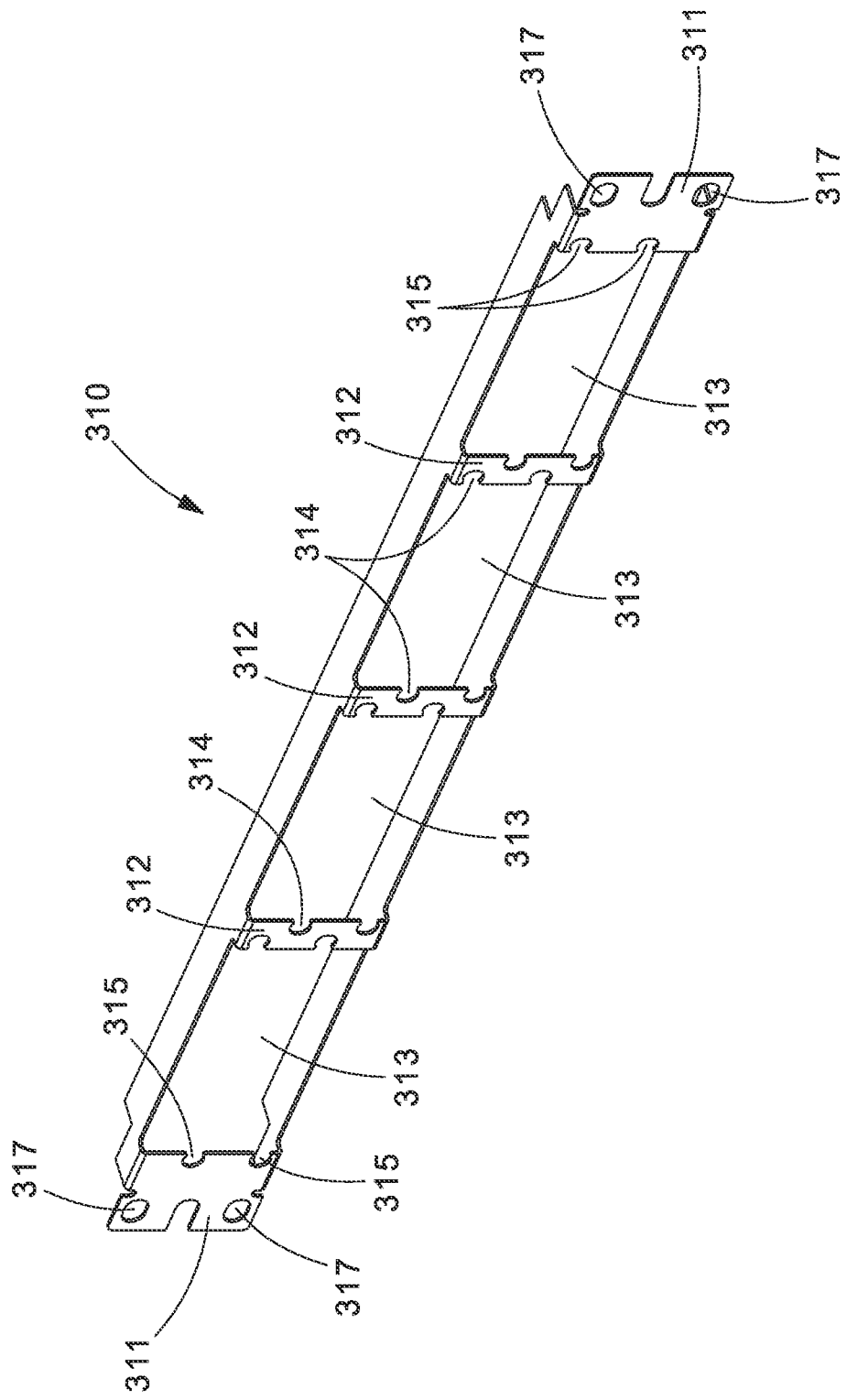
FIG. 18 is a perspective view of the patch panel shown in FIG. 16, where the patch panel is not yet populated with any installed cassettes.

In FIG. 18 the patch panel 310 is shown without having any cassettes 320 mounted. The patch panel 310 includes four openings 313 for allowing the cassettes 320 to be received and mounted. The openings 313 are separated by separator columns 312, where the separator columns 312 include mounting features 314 that are used when mounting the cassette 320. The inner sides of the flanges 111 also include mounting features 315 that are used when mounting the cassette 320. The mounting features 314, 315 accept fasteners mounted in the cassette flanges 311 to secure the cassettes 320 to the front of the patch panel 310. The flanges 311 on the patch panel 310 are used to mount the patch panel 310 to a telecom equipment rack, cabinet, enclosure or other mountable equipment. Each opening 313 is configured to accept up to 2 cassettes 320 mounted into a column.

Figure 19:
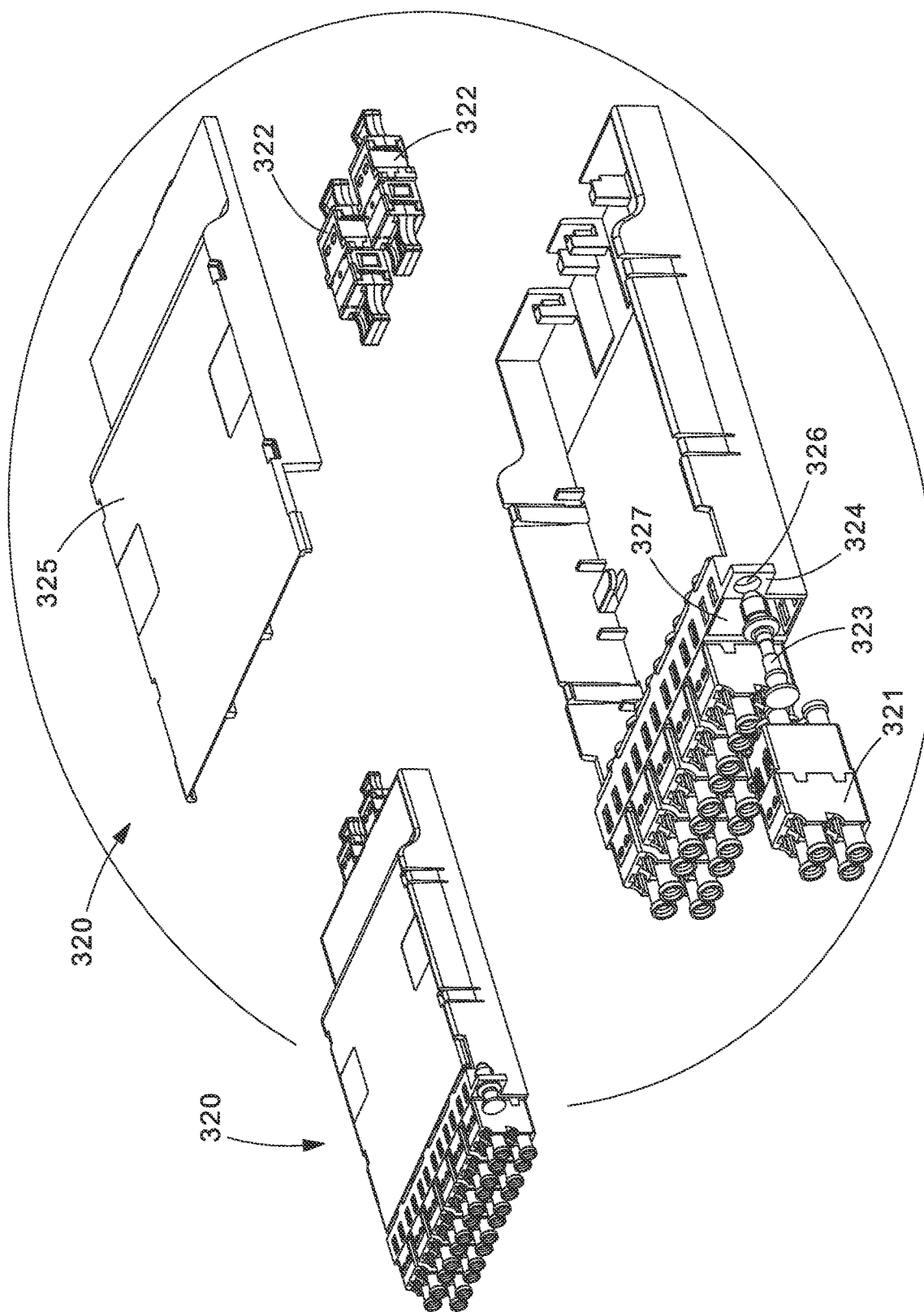
FIG. 19 is an exploded perspective view of a cassette installed into the patch panel shown in FIG. 16, according to some embodiments.

FIG. 19 shows an exploded view of the cassette 320. Each cassette 320 is configured to install up to six stacked double high duplex LC adapters as the front side adapter 321 through six corresponding openings 327 in the front. The cassette 320 shown in FIG. 19 also includes two openings in the rear to accept two rear adapters 322, for example MPO adapters.

The stacked double high duplex LC adapter 321 supports two LC duplex connections in a geometry having one LC duplex connection in width and two LC duplex connections in height (e.g., a 1×2 configuration). Six of these stacked double high duplex LC adapters are used in this 1×2 configuration in the cassette 320, however it is noted that other stacked array configurations are possible such as a 2×2, 3×2, 4×2, and 6×2. It follows that the stacked double high duplex LC adapters have a similar dimension as two duplex LC adapters stacked on top of each other, as described in more detail below with reference to at least FIGS. 21-23.

FIG. 19 also shows fasteners 323 (e.g., push pins) are pre-installed in the holes 326 in the two cassette flanges 324 located at opposite ends of the cassette 320. The flanges 324 have holes 326 to accept or pass the fastener 323 through them. The fasteners 323 secure the cassette 320 to the patch panel 310. Note other embodiments can use fasteners that may not be pre-installed in the holes 326. The flanges 324 also interface with the front face of the patch panel 310 to prevent the cassette 320 from passing through the patch panel opening 313 it is being mounted onto the patch panel 310.

Figure 20:
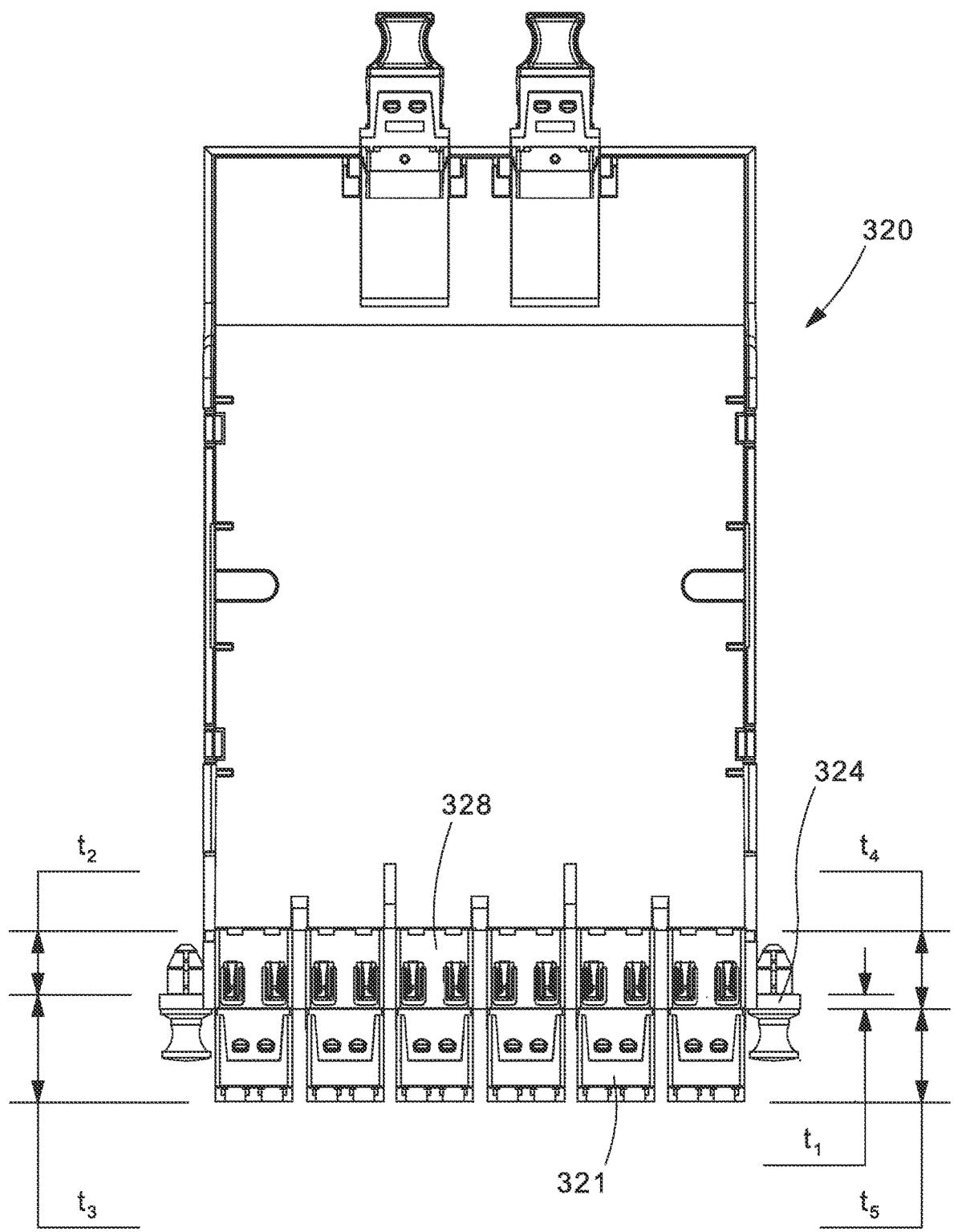
FIG. 20 is a top-down view of a cassette installed into the patch panel shown in FIG. 16.

FIG. 20 is a top-down view showing certain dimensional measurements of the cassette 320 where six of the stacked double high duplex LC adapters have been installed into it as the front side adapters 321. The measurements in FIG. 20 are provided in inches (mm). For example, a thickness of the cassette flange 324 may be measured as $t_1$ being 0.093 inches (2.37 mm), a depth of the front-side of the cassette 320 behind the cassette flange 324 may be measured as $t_2$ being 0.437 inches (11.09 mm), a depth that measures the cassette flange 324 to the front side adapter 321 may be measured as $t_3$ being 0.713 inches (18.11 mm), a depth measuring a front-side panel 328 of the cassette 320 behind the flange 324 (including the thickness of the cassette flange 324) may be measured as $t_4$ being 0.530 inches (13.46 mm), and a depth of the front side adapter 121 may be measured as $t_5$ being 0.620 inches (15.75 mm).

Figure 21:
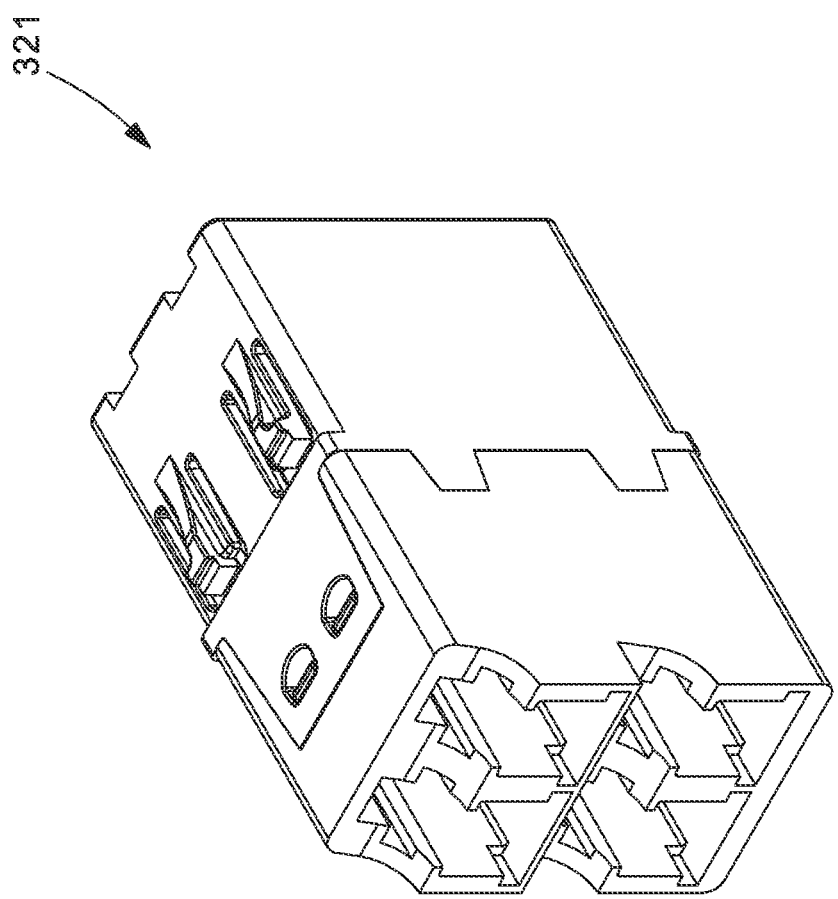
FIG. 21 is a perspective view of a stacked double high duplex connector adapter array for installation into, for example, the cassette shown in FIG. 19.
Figure 22:
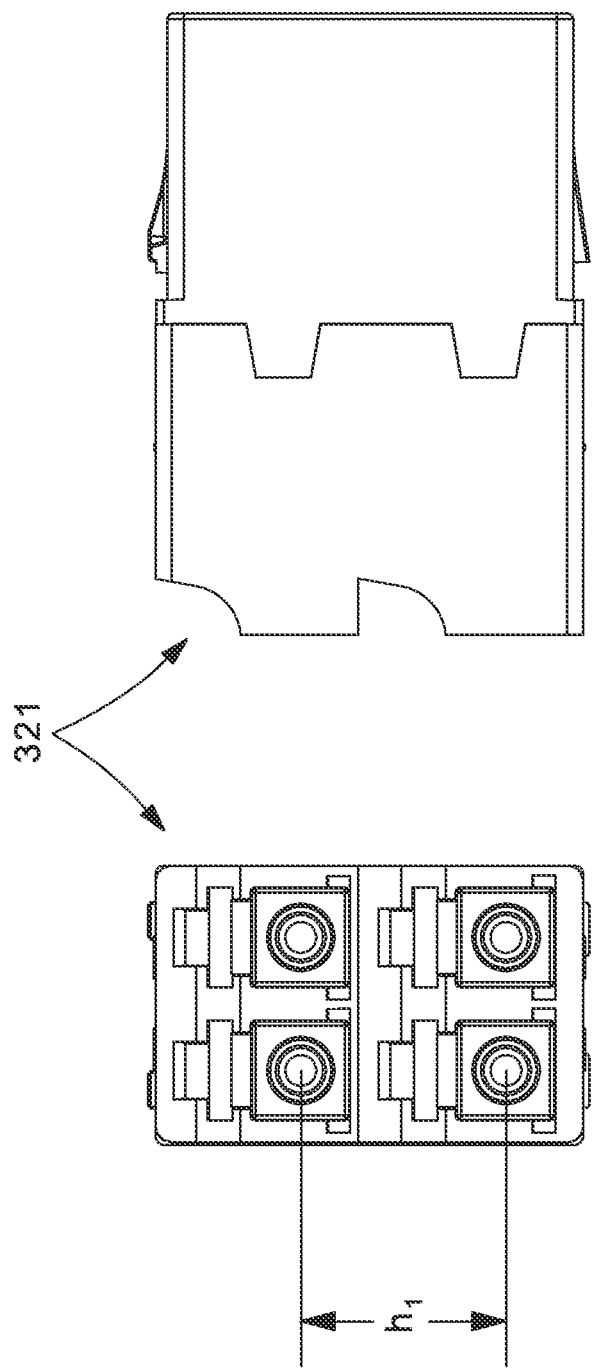
FIG. 22 is a front-side view and side-view depicting dimensions of the adapter array shown in FIG. 21.
Figure 23:
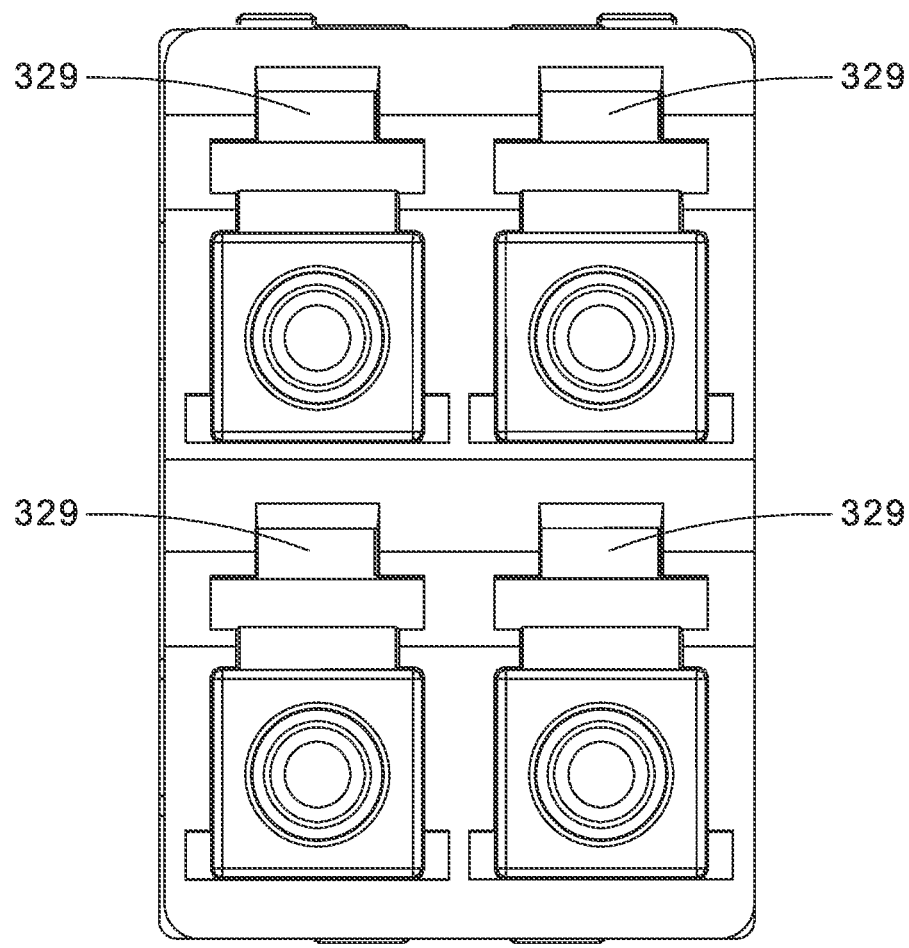
FIG. 23 is a front-side view of the adapter array shown in FIG. 21.

FIGS. 21-23 show views of the stacked double high duplex LC adapter 321 (hereinafter the "adapter array"). FIG. 21 shows a perspective view of the adapter array 321, where the adapter array 321 can be seen to take up the dimensions similar to two duplex LC adapters combined into a single, monolithic adapter. Space savings is the primary advantage of this one-piece stacked design of the adapter array 321 over physically stacking two duplex LC adapters on top of each other.

FIG. 22A shows a front side view of the adapter arrays 321, and FIG. 22B shows a side profile view of the adapter array 321. The adapter array 321 is shown to have a vertical distance between a centerline of the adapters of hi being 0.38 inches, whereas the same centerline vertical distance for two duplex LC adapters stacked on top of each other would be 0.47 inches. With the shorter height of the adapter array 321, the opening 327 in the cassette 320 for accepting the adapter array is 0.75 inches, which is smaller than what would be needed to stack two duplex LC adapters on top of each other.

As shown in FIG. 23, on the adapter array 321 the openings for the LC connector laches 329 are configured to face in the upward direction. This provides the consistency with respect to how a user inserts and removes connectors from the upper and lower openings in the adapter array 321 and provides a uniform polarity scheme between the upper and lower openings in the adapter array 321.

Figure 24:
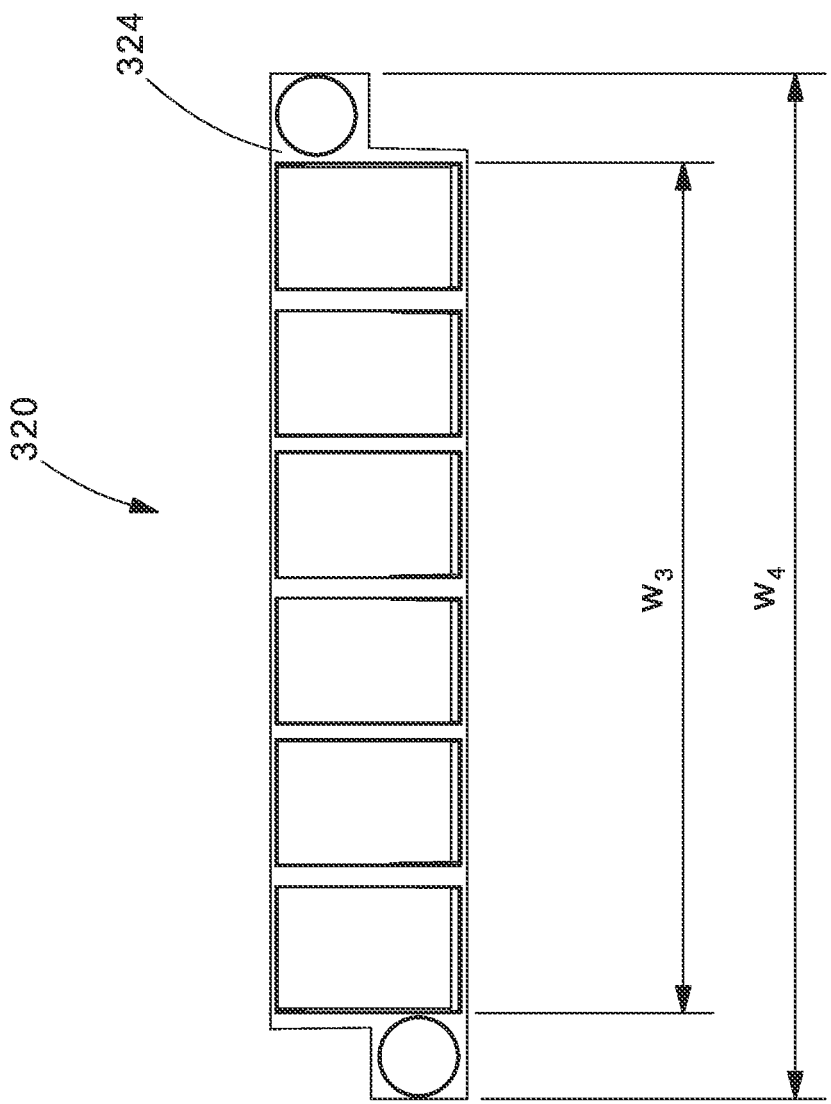
FIG. 24 is a front-side view of a cassette installed into the patch panel shown in FIG. 16, where the cassette includes openings for receiving the adapter array shown in FIG. 21.

FIG. 24 is a front-side view of the cassette 320 without having the adapter arrays 321 installed, thus exposing the front side adapter openings 327 of the cassette 320. The dimensions and form factor ratios are as follows:

$W_3$>90 mm (3.543 inches) $W_3$ is measured from end-to-end of the front-side openings 327.

$W_4$>105.882 mm (4.169 inches), where $W_4$ measures a front face which is measured from end-to-end of the cassette flanges 324.

Figure 25:
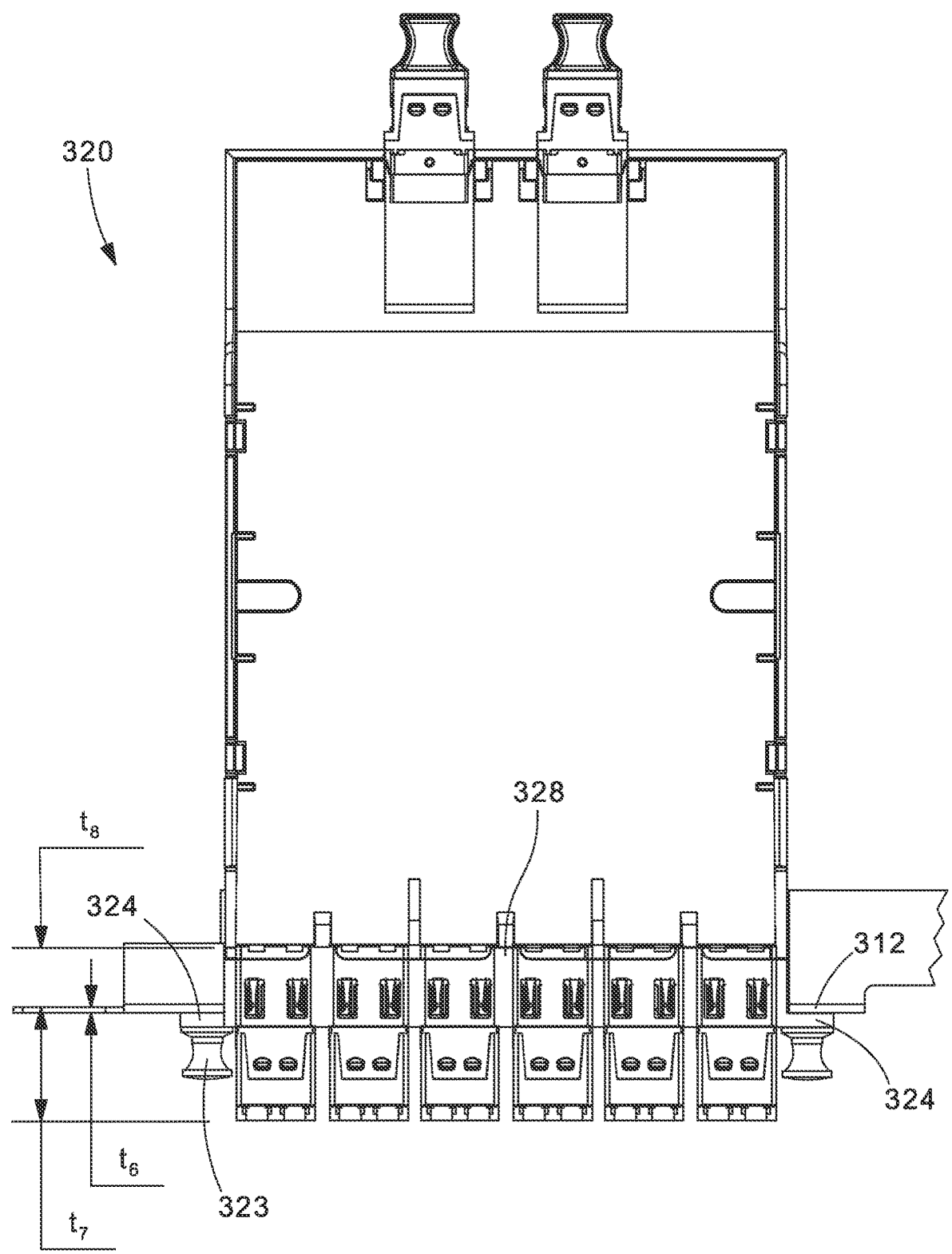
FIG. 25 is a top-down view of a cassette installed into the patch panel shown in FIG. 16.

FIG. 25 is a top-down view of the cassette 320 having the adapter arrays 321 installed, and the cassette 320 being mounted to the patch panel 310. The dimensions shown are provided in inches (mm). For example, a thickness of the patch panel flanges 311 may be measured as to being 0.038 inches (0.95 mm), a depth from the patch panel flanges 311 to a front of the front side adapter 321 (including the thickness of the patch panel flange 311) may be measured as $t_7$ being 0.75 inches (19.06 mm), and a depth from the patch panel flanges 311 back to a rear end of the front-side panel 328 (not including the thickness of the patch panel flange 311) may be measured as $t_8$ being 0.400 inches (10.15 mm).

Figure 26:
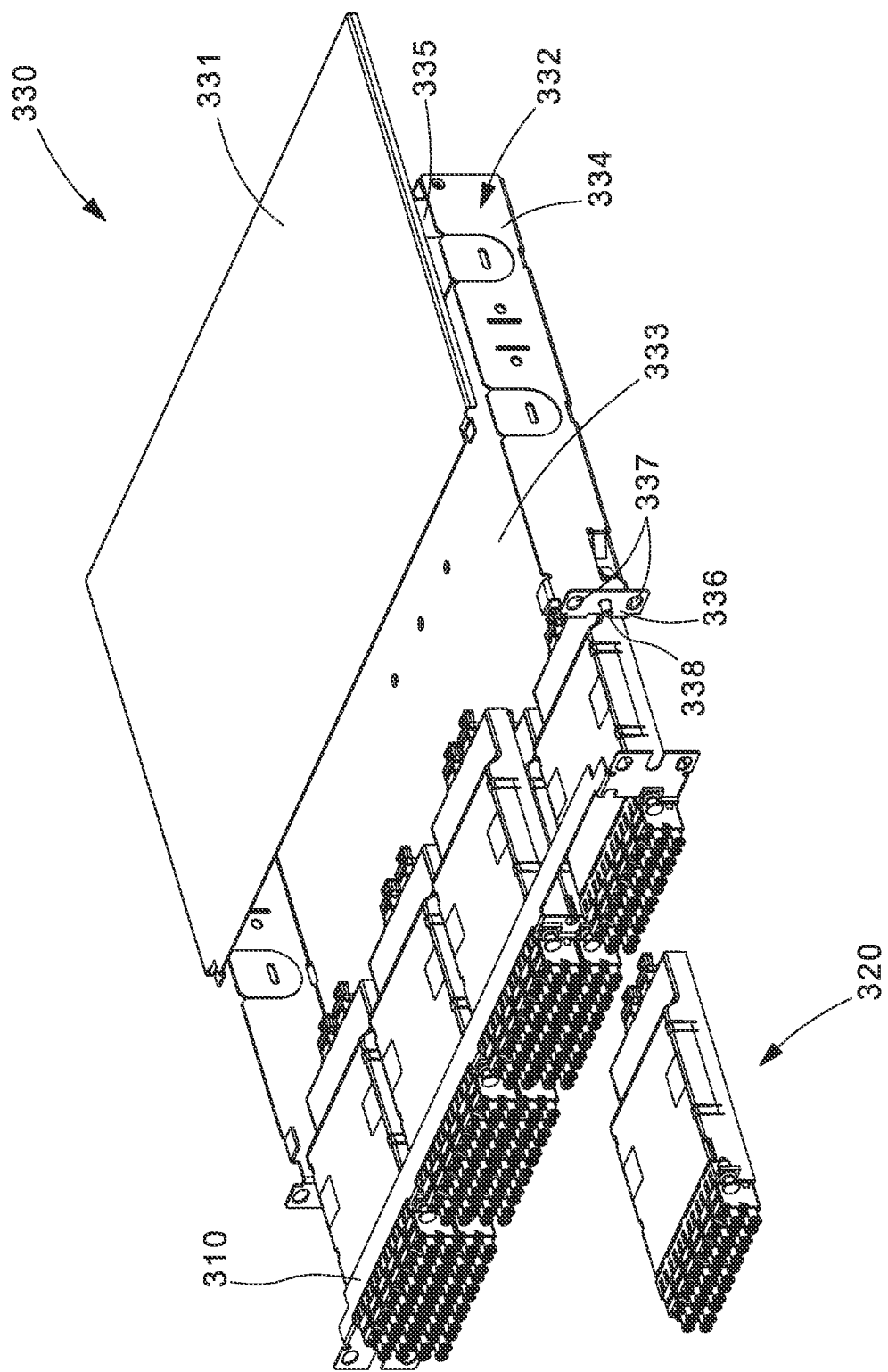
FIG. 26 is a partially exploded perspective view of the patch panel shown in FIG. 16 mounted onto an enclosure, according to another embodiment, where a top cover of the enclosure is removed to show internal components of the enclosure.

FIG. 26 shows a perspective view of the patch panel 310 having the adapter arrays 321 installed, and mounted to an enclosure 330, according to another embodiment. The enclosure 330 comprises mainly of a top cover 331 and a base 332. The top cover 331 may be fitted and secured to the enclosure base 332. The enclosure base 332 includes a bottom 335, side walls 334, a rear wall 335, and attached or incorporated mounting flanges 336. The top and front portions of the enclosure base 332 are generally open when the top cover 331 and the patch panel 310 are not mounted.

The mounting flanges 336 are attached to, or incorporated into the enclosure base 332, and are utilized to mount and dismount the enclosure onto mounting rails of a rack or cabinet (not shown), where the mounting flanges 336 includes holes 337 for fasteners (not shown) to pass through to secure the enclosure 330 to the rack/cabinet. In the embodiment shown in FIG. 26, the mounting flanges 336 also include an optional threaded post 338 which may be used to secure the patch panel 310 to the enclosure 330 prior to mounting the enclosure 330 to the rack/cabinet. The threaded post 338 may be incorporated into the enclosure's mounting flanges 336 to enable the patch panel 310 to be secured to the enclosure 330 with a fastener such as the nut 116 previously shown in FIG. 9. The nut 116 is used on conjunction with the threaded post 338 to secure the patch panel 310 to the enclosure 330.

According to some embodiments, an installation procedure for installing patch panel 310 onto the enclosure 330 may include:
1. Sliding the patch panel 310 (with or without cassettes 320 installed) into the front of the enclosure 330.
2. Using the nuts 116, securing the patch panel 310 to the front of the enclosure 330 using the threaded posts 338.
3. Placing the assembly including the patch panel 310 installed onto the enclosure 330 into the rack/cabinet.
4. Placing fasteners through the patch panel 310 and enclosure mounting holes 337, and tightening to secure the assembly to the rack.
5. Adding cassettes 320 to the patch panel 310 and cabling to the enclosure 330, as desired.
6. Attach the cover 331 to the enclosure base 332.

According to other embodiments, different assembly sequences are possible. For example, steps 5 and 6 could be completed before step 4.

Figure 27:
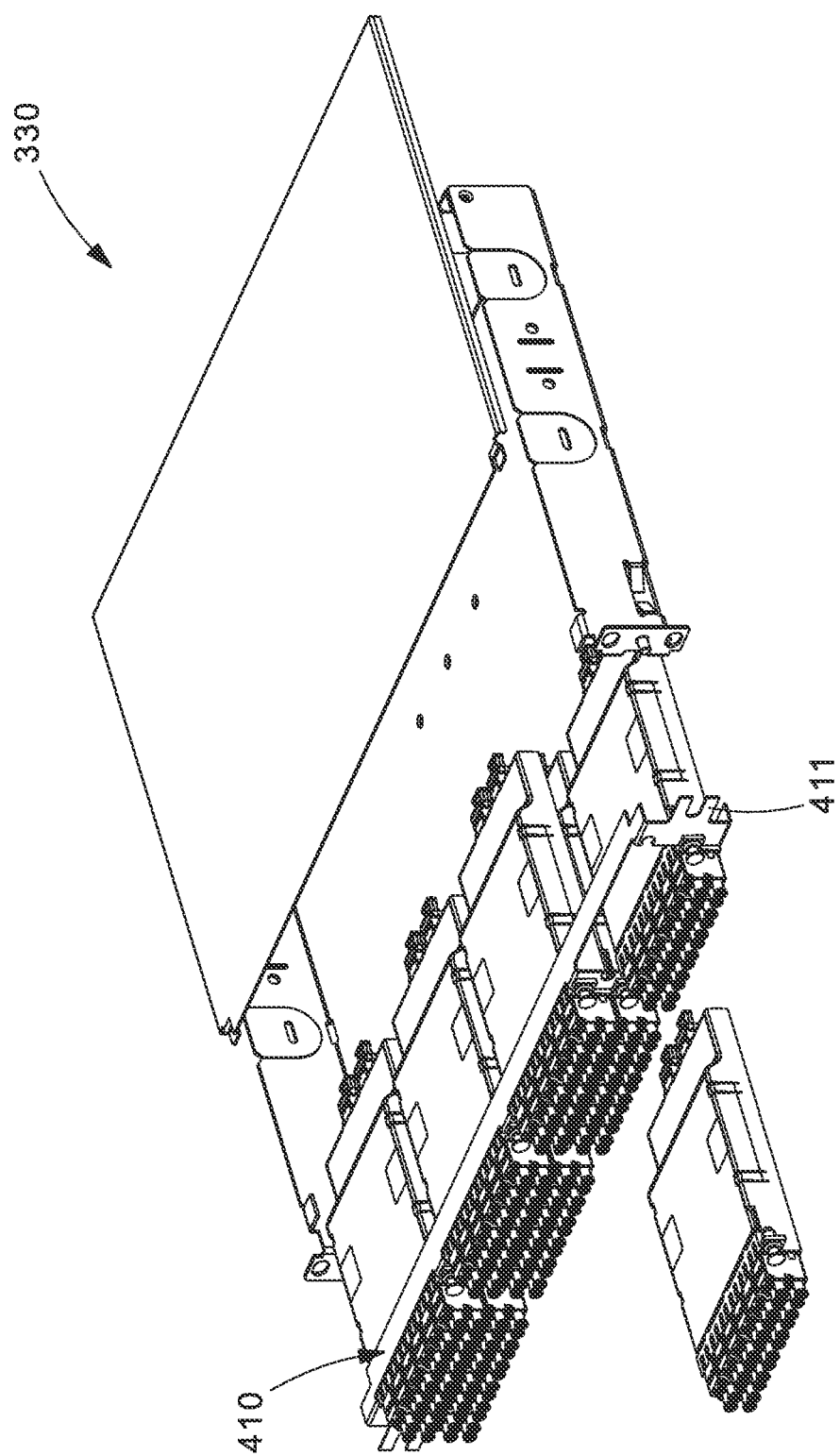
FIG. 27 is a partially exploded perspective view of an alternative patch panel mounted onto an enclosure, according to another embodiment, where the alternative patch panel is similar to the patch panel shown in FIG. 16 but includes a different design for the patch panel flange used for mounting the patch panel to the enclosure.

FIG. 27 shows an alternative patch panel 410, where the patch panel 410 is the same as patch panel 310 other than an alternative design for the mounting flanges 411 that are relieved to omit the mounting holes 337 in comparison to the mounting flanges 311 in the patch panel 310.

According to some embodiments, an installation procedure for installing patch panel 410 onto the enclosure 330 may include:
1. Sliding the patch panel 410 into the front of the enclosure 330.
2. Using the nuts 116, secure the patch panel 410 to the front of the enclosure 330 using the threaded posts 338.
3. Placing the assembly including the patch panel 410 and the enclosure 330 in the rack/cabinet.
4. Placing fasteners through the enclosure mounting holes 337 and tightening to secure the assembly to the rack/cabinet.
5. Adding cassettes 320 and cabling as desired to the patch panel 410 and enclosure 330.
6. Attaching the cover 331 to the enclosure base 332.

The use of the alternate mounting flanges 411 in the patch panel assembly 410 allows it to be removed from the enclosure 330 by simply removing the nuts 116, which saves an installer from having to first remove the enclosure 330 from the rack. According to other embodiments, different assembly sequences are possible. For example, steps 5 and 6 could be completed before step 4.

Figure 28:
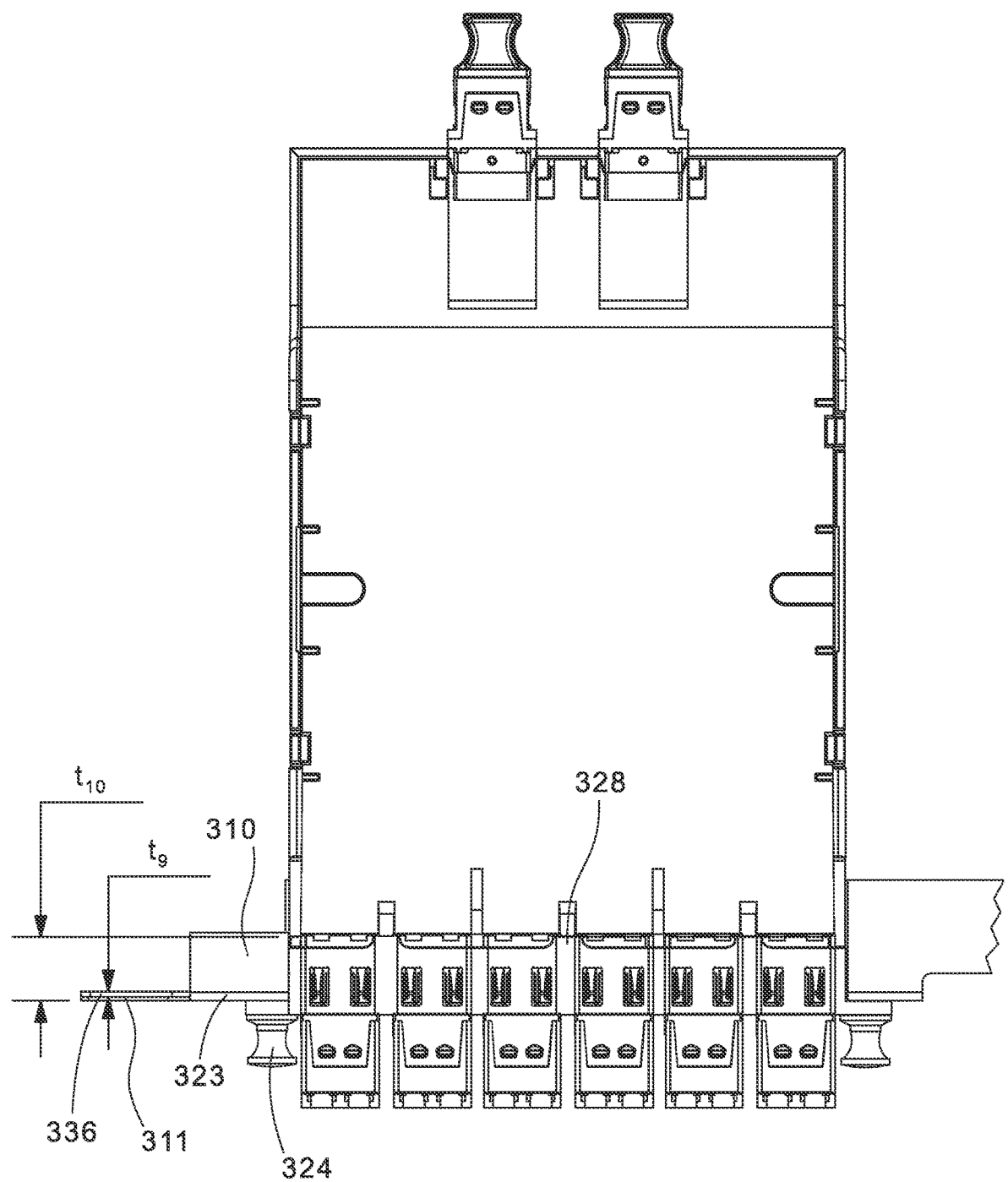
FIG. 28 is a top-down partial view of a cassette installed into the patch panel and enclosure shown in FIG. 26.

FIG. 28 is a top-down view of the patch panel 310 including the adapter arrays 321 installed and mounted to the enclosure 330. The measurements provided in FIG. 28 are provided in inches (mm). So in addition to the measurements provided in FIG. 25 where the cassette 320 is shown installed into the patch panel 310, FIG. 28 additionally shows measurements from when the patch panel system 300 is installed into the enclosure 330, such as a thickness of the enclosure mounting flange 336 as to being 0.060 inches (1.52 mm), and a distance from the enclosure mounting flange 336 back to a rear of the front-side panel 128 as $t_{10}$ being 0.437 inches (11.09 mm). All other distances from FIGS. 20 and 25 relating to the patch panel 310 and cassette 320 are applicable to the patch panel system 300 mounted into the enclosure 330 shown in FIG. 28.

According to some alternative embodiments, the patch panel system 300 may be mounted to an alternative enclosure including a sliding tray and cable management features in the front, such as the enclosure 230 shown earlier in FIG. 13.

Figure 29A:
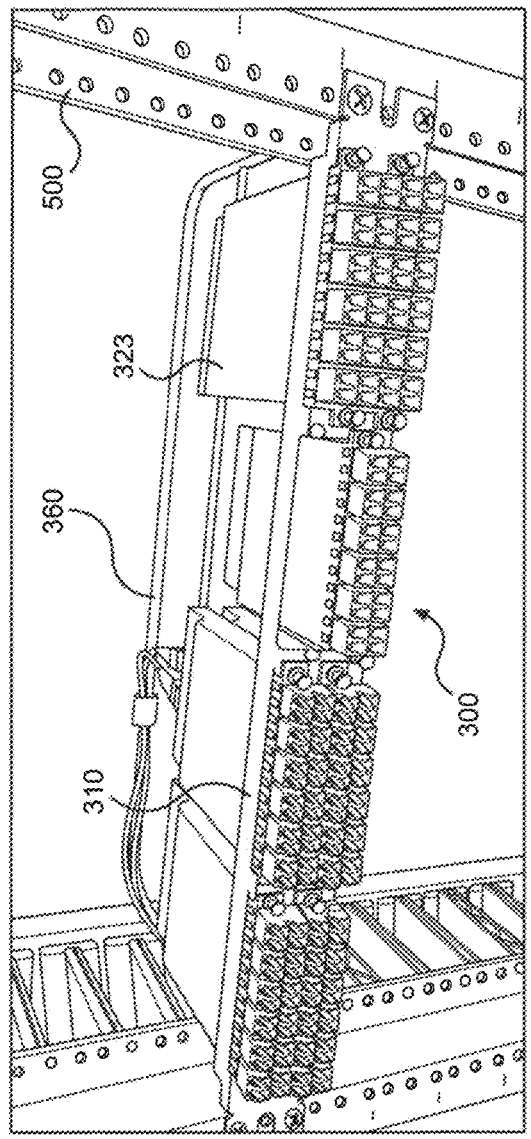
FIG. 29A is a front side perspective view of the patch panel shown in FIG. 16 installed into a rack with a cable manager, according to an embodiment.

FIG. 29A shows is a front side perspective view of the patch panel 310 installed into a rack 500, where the patch panel 310 is mounted with a number of cassettes 320, and also includes a rear cable manager 360 for managing cables running through the rear side of the patch panel 310.

Figure 29B:
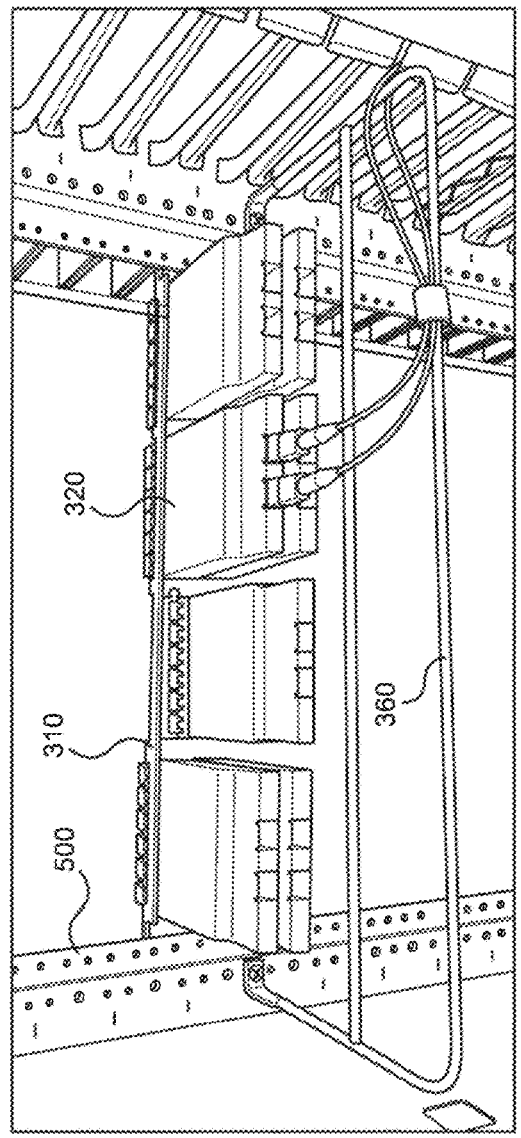
FIG. 29B is a rear side perspective view of the patch panel shown in FIG. 16 installed into a rack with a cable manager, according to an embodiment.

FIG. 29B shows is a rear side perspective view of the patch panel 310 installed into the rack 500, which provides a better view of the rear cable manager 360 managing cables running through the rear side of the patch panel 310.

Figure 30:
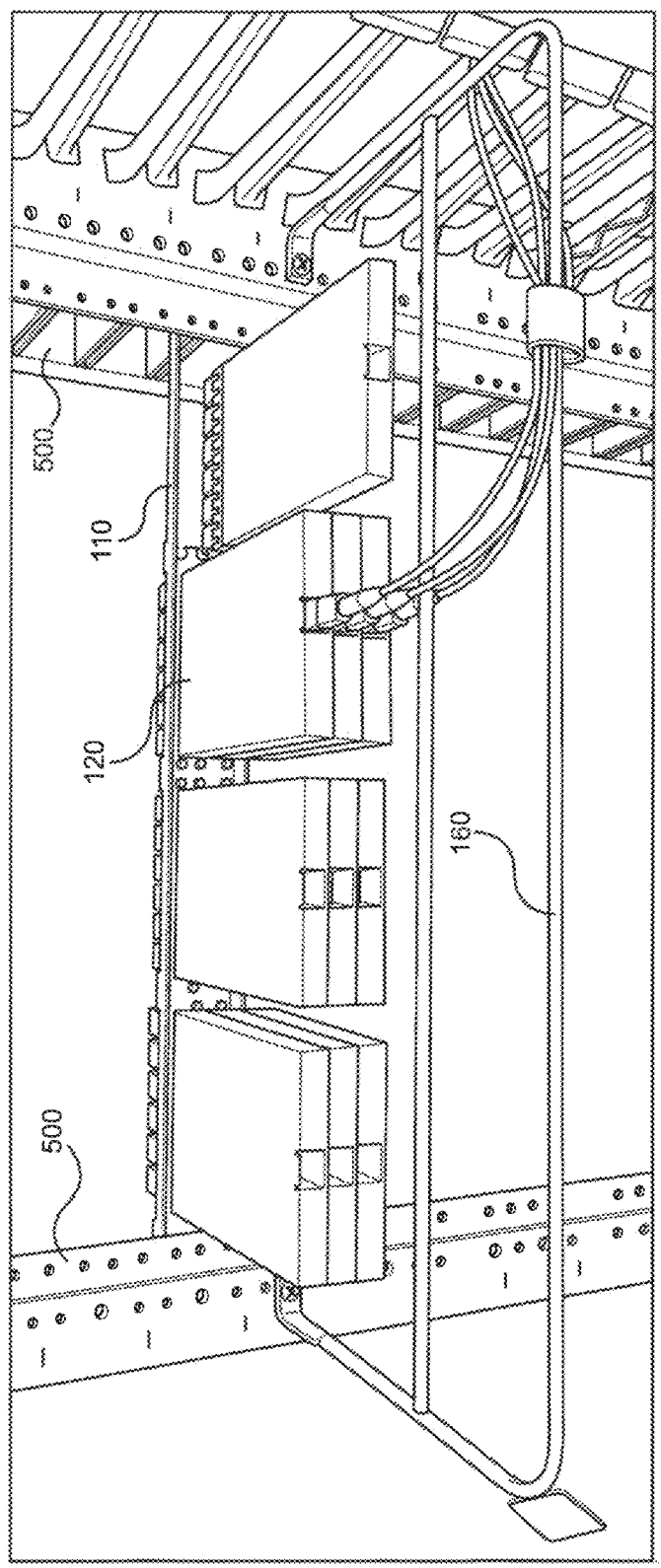
FIG. 30 is a rear side perspective view of the patch panel shown in FIG. 1 installed into a rack with a cable manager, according to an embodiment.

FIG. 30 shows is a rear side perspective view of the patch panel 110 installed into the rack 500, which provides a better view of a rear cable manager 160 managing cables running through the rear side of the patch panel 110.

Figure 31B:
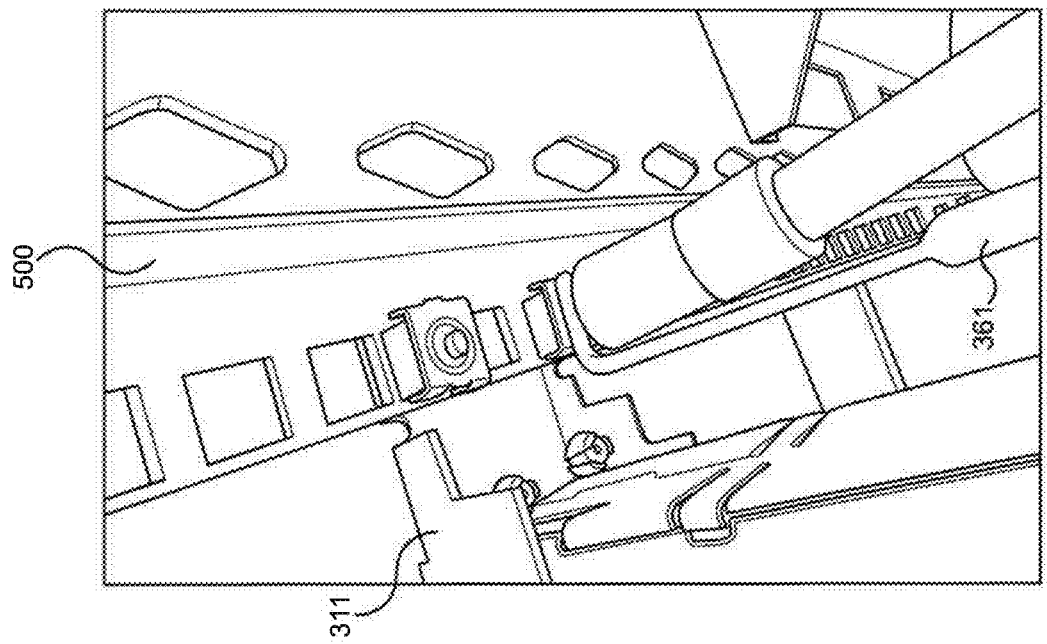
FIG. 31B is a perspective view of the back side of the patch panel mounting flange installed onto a rack shown in FIG. 31A, where a mounting arm of a cable manager is being installed using a fastener tool, according to an embodiment.
Figure 31A:
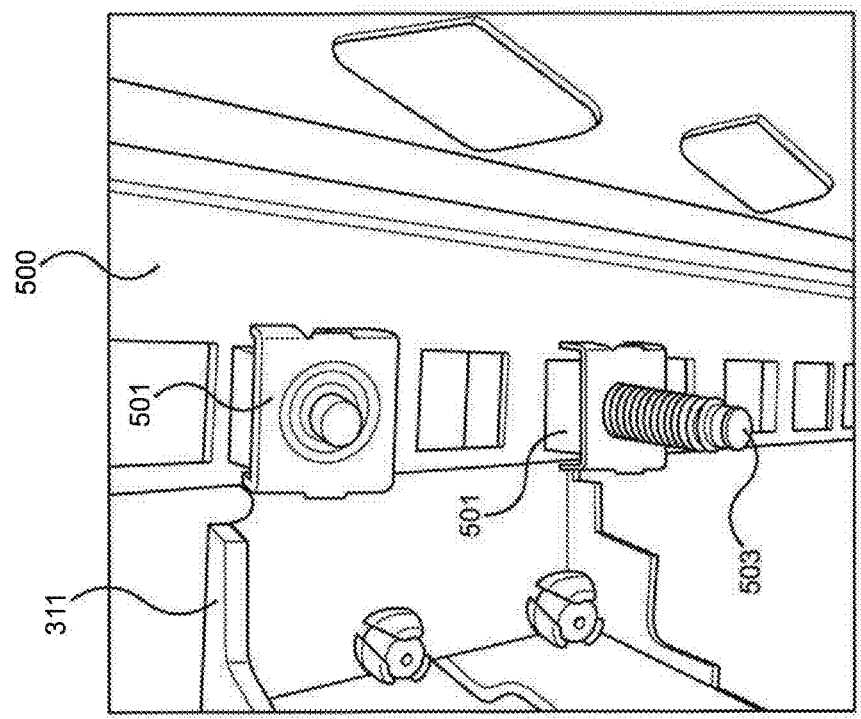
FIG. 31A is a perspective view of a back side of a patch panel mounting flange installed onto a rack, according to an embodiment.
Figure 32:
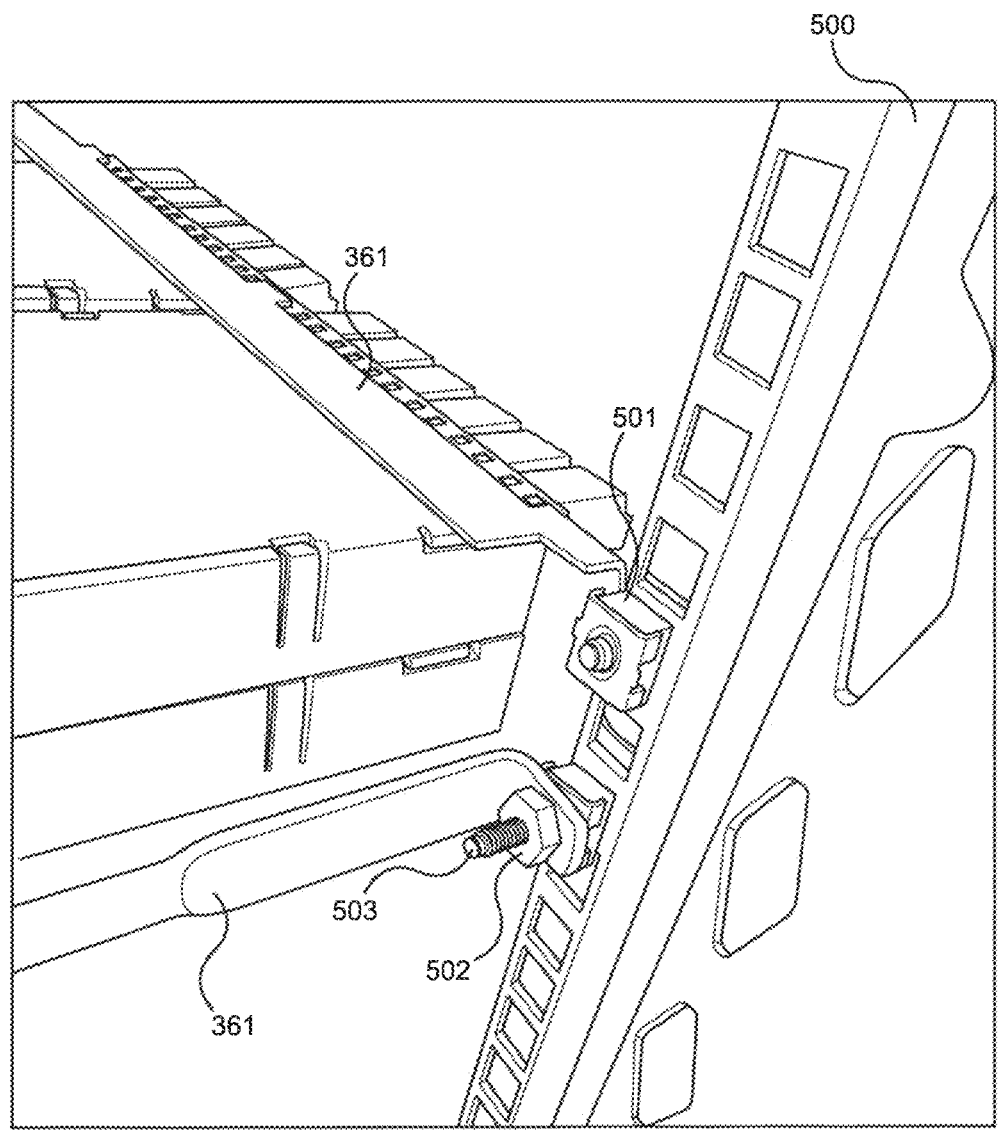
FIG. 32 is a perspective view showing the mounting arm of the cable manager shown in FIG. 31B in an installed state, according to an embodiment.

FIG. 31A shows a perspective view of a back side of the mounting flange 311, where fasteners are placed through the mounting holes in the mounting flanges 311 and through the mounting holes in the rack 500, and cage nuts 501 are tightened over these fasteners at the rear side of the rack 500. One of these fasteners is a long fastener 503. As shown in FIG. 31B, a mounting arm 361 of the cable manager 360 is secured to the long fastener 503 by tightening a nut 502 using a fastener tool 600. FIG. 32 provides a view of the mounting arm 361 secured to the long fastener 503 by the nut 502.

Figure 33A:
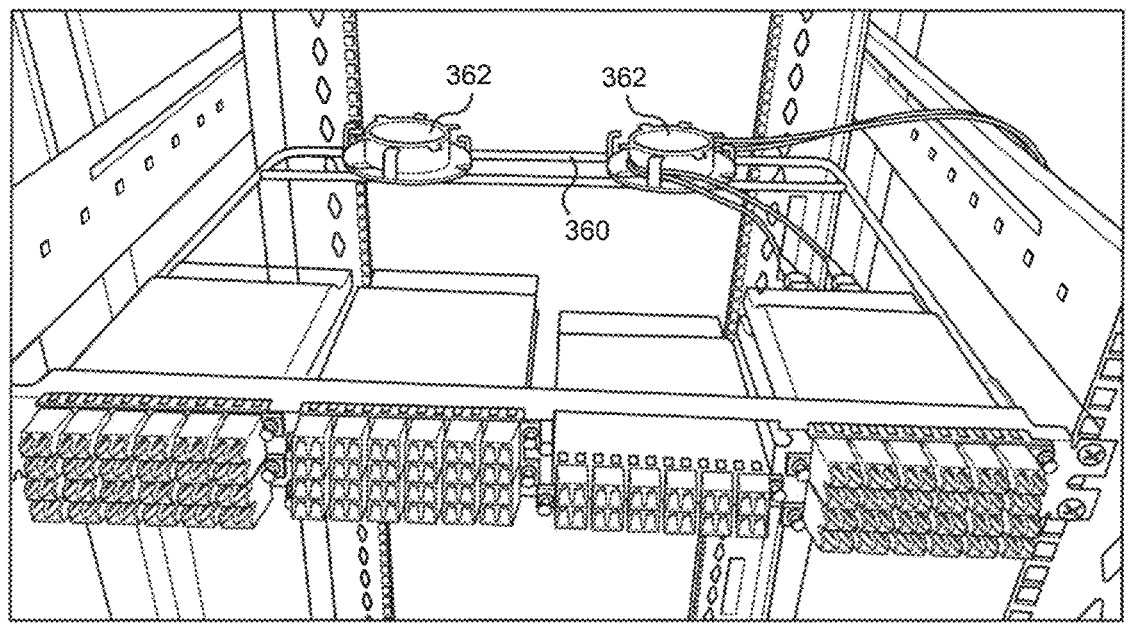
FIG. 33A is a front side perspective view of the patch panel shown in FIG. 16 installed into a rack with a cable manager including a spool, according to an embodiment.

FIG. 33A shows is a front side perspective view of the patch panel 310 installed into the rack 500, where the patch panel 310 is mounted with a number of cassettes 320, and also includes a rear cable manager 360 including a spool 362 for managing cables running through the rear side of the patch panel 310.

Figure 33B:
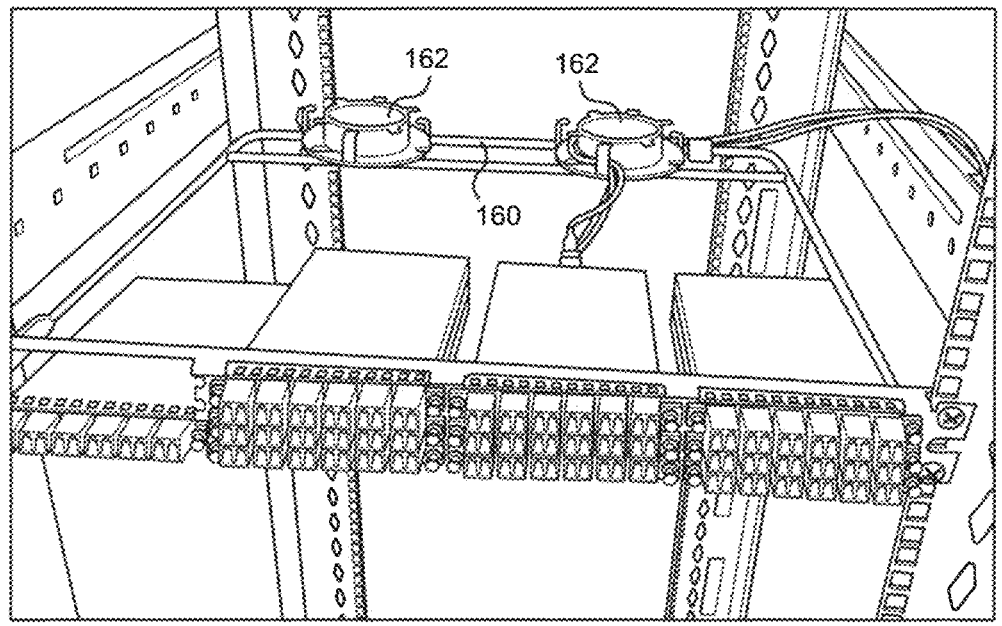
FIG. 33B is a front side perspective view of the patch panel shown in FIG. 1 installed into a rack with a cable manager including a spool, according to an embodiment.

FIG. 33B shows is a front side perspective view of the patch panel 110 installed into the rack 500, where the patch panel 110 is mounted with a number of cassettes 120, and also includes a rear cable manager 160 including a spool 162 for managing cables running through the rear side of the patch panel 110.

Furthermore, while the particular embodiments described herein have been shown and described, it will be obvious to those skilled in the art that changes and modifications may be made without departing from the teaching described herein with reference to the components and features of the high-density fiber management system. The matter set forth in the foregoing description and accompanying drawings is offered by way of illustration only and not as limitation. The actual scope of the disclosure is intended to be defined in the following claims when viewed in their proper perspective.

What is claimed is:

1. A fiber management system comprising:
a patch panel configured to fit within a Rack Unit (RU) space, the patch panel including a plurality of mounting openings; and
a module including a plurality of openings at a front side, the plurality of openings configured to hold adapters that support duplex fiber optic connecters where each duplex fiber optic connector consists of two fiber connections, the module configured to fit within the mounting openings, wherein when the patch panel is fully mounted by a plurality of modules the patch panel supports at least 192 fiber connections per RU utilizing the adapters that support the duplex fiber optic connectors.

2. The fiber management system of claim 1, wherein the module supports up to 24 fiber connections.

3. The fiber management system of claim 1, wherein the plurality of openings in the module includes at least 6 openings, each opening configured to receive a stacked double high LC duplex adapter.

4. The fiber management system of claim 3, wherein the LC duplex double stacked adapter has a height of 0.75 inches or less.

5. The fiber management system of claim 3, wherein a vertical centerline pitch between LC connectors positioned on top of each other in the LC duplex double stacked adapter is 0.38 inches or less.

6. The fiber management system of claim 3, wherein a latch opening for each adapter opening in the LC duplex double stacked adapter faces a same direction.

7. The fiber management system of claim 1, wherein the plurality of openings in the module occupy more than 85% of a width of the front face of the module.

8. The fiber management system of claim 1, wherein the patch panel supports up to two rows of modules.

9. The fiber management system of claim 1, wherein the patch panel supports up to four rows of 48 fiber connections along four different horizontal planes.

10. The fiber management system of claim 1, wherein the patch panel supports up to four columns of modules.

11. The fiber management system of claim 1, wherein the module includes flanges on opposite sides of the module that are positioned on different horizontal planes.

* * * * *